(12) United States Patent
Priezzhev et al.

(10) Patent No.: US 9,645,268 B2
(45) Date of Patent: May 9, 2017

(54) SEISMIC ORTHOGONAL DECOMPOSITION ATTRIBUTE

(71) Applicant: Schlumberger Technology Corporation, Sugar Land, TX (US)

(72) Inventors: Ivan Priezzhev, Houston, TX (US); Aaron Scollard, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 983 days.

(21) Appl. No.: 13/915,408

(22) Filed: Jun. 11, 2013

(65) Prior Publication Data
US 2013/0345985 A1    Dec. 26, 2013

Related U.S. Application Data

(60) Provisional application No. 61/663,640, filed on Jun. 25, 2012.

(51) Int. Cl.
G01V 1/28 (2006.01)
G01V 1/32 (2006.01)

(52) U.S. Cl.
CPC . *G01V 1/28* (2013.01); *G01V 1/32* (2013.01)

(58) Field of Classification Search
CPC combination set(s) only.
See application file for complete search history.

(56) References Cited

U.S. PATENT DOCUMENTS

| | | | |
|---|---|---|---|
| 5,377,104 A | 12/1994 | Sorrells et al. | |
| 7,136,765 B2 | 11/2006 | Maier et al. | |
| 2004/0220744 A1 | 11/2004 | Voutay et al. | |
| 2007/0274155 A1 | 11/2007 | Ikelle | |
| 2009/0093963 A1 | 4/2009 | Rasolofosaon et al. | |
| 2009/0132169 A1 | 5/2009 | Bordakov | |
| 2009/0231955 A1 | 9/2009 | Barnes | |
| 2010/0262373 A1 | 10/2010 | Khadhraoui et al. | |
| 2012/0143510 A1 | 6/2012 | Alam | |
| 2015/0168574 A1* | 6/2015 | Wallet et al. | G01V 1/28 |

FOREIGN PATENT DOCUMENTS

| | | |
|---|---|---|
| CN | 1873443 A | 12/2006 |
| WO | 2011077223 A2 | 6/2011 |

OTHER PUBLICATIONS

Pearson, K. "On lines and planes of closest fit to systems of points in space", Philosophical Magazine Series 6, 1901, vol. 2(11): pp. 559-572.

Koval, L. A. et al. "Interpretation of complex data based on recognition and classification in an automated system for processing airborne system", Geology and Geophysics, 1984, vol. 9(277): pp. 127-133.

(Continued)

*Primary Examiner* — Huan Tran
(74) *Attorney, Agent, or Firm* — Alec J. McGinn; Colin Wier

(57) ABSTRACT

A method can include providing seismic data for a subsurface region that includes a reflector; decomposing at least a portion of the seismic data using principal component analysis (PCA) to generate at least one principal component; and outputting output data based at least in part on the at least one principal component. Various other apparatuses, systems, methods, etc., are also disclosed.

20 Claims, 20 Drawing Sheets

(56) References Cited

OTHER PUBLICATIONS

Nikitin, A.A. "Statistical methods of geophysical anomaly definition", M.: Nedra, 1979.
Koval, L. A. et al., "Interpretation technology of complex airborne materials in the system ASOM-AGS/ES and the results of their use in Eastern Tuva", Geology and Geophysics, 1987, vol. 6: pp. 81-92.
Flynn, P. J. et al., "On reliable curvature estimation", IEEE Conference on Computer Vision and Pattern Recognition, Jun. 1989: pp. 110-116.
Dalley, R. M. et al., "Dip and azimuth displays for 3D seismic interpretation", First Break, 1989, vol. 7(3): pp. 86-95.
Scheevel, J. R. et al., "Principal Component Analysis Applied to 3D Seismic Data for Reservoir Property Estimation", SPE 56734, SPE Annual Technical Conference and Exhibition, Oct. 1999: pp. 1-15.
Roberts, A., "Curvature attributes and their application to 3D interpreted horizons", First Break, Feb. 2001, vol. 19(2): pp. 85-100.
Liang, Y. C. et al., "Proper orthogonal decomposition and its applications—part I: Theory", Journal of Sound and Vibration, May 2002, vol. 252(3): pp. 527-544.
Rathinam, M. et al., "A new look at proper orthogonal decomposition, SIAM Journal on Numerical Analysis", 2003, vol. 41(5): pp. 1893-1925.
Chopra, S. et al., "Seismic attributes—A historical perspective", Geophysics, Sep.-Oct. 2005, vol. 70(5), 3SO-28SO: pp. 1-26.
Marfurt, K.J., "Robust estimates of 3D reflector dip and azimuth", Geophysics, Jul.-Aug. 2006, vol. 71(4): pp. P29-P40.
Chopra, S. et al., "Seismic Attributes—a promising aid for geologic prediction", CSEG Recorder, 30, Sep. 2006: pp. 110-121.
Luo, Z. et al., "Proper orthogonal decomposition approach and error estimation of mixed finite element methods for the tropical Pacific Ocean reduced gravity model", Computer Methods in Applied Mechanics and Engineering, 2007, vol. 196: pp. 4184-4195.
Chopra, S. et al., Volumetric curvature attributes for fault/fracture characterization. First Break, Jul. 2007, vol. 25: pp. 19-30.
Priezzhev, I. I., "Prestack and poststack seismic inversion workflow in frequency domain", EAGE/EAGO/0SEG, 4th Saint Petersburg International Conference, 2010, B24: pp. 1-4.
Priezzhev, I. I. et al., [2012]. "Faults and Fracture Detection based on Seismic Surface Orthogonal Decomposition", W041, 74th EAGE Copenhagen, Jun. 2012: pp. 1-5.
International Search Report and Written Opinion of PCT Application No. PCT/US2013/045785 dated Sep. 2, 2013: pp. 1-12.
Al-Bannangi, et al., "Acquisition footprint suppression via the truncated SVD technique: Case studies from Saudi Arabia", Aug. 1, 2005, The Leading Edge, pp. 832-834.
Hoyes, et al., "A review of 'global' interpretation methods for automated 3D horizon picking", Jan. 1, 2011, The Leading Edge, pp. 39-47.
Wang etal "Enhancement of signal to noise ratio of seismic date based on the PCA method", Jun. 30 2011, Progress in Geophysics, vol. 26, No. 3, pp. 1039-1044.
Office Action issued in related EP application 13810153.0 on Jun. 21, 2016, 6 pages.
European Search Report issued in related EP application 13810153.0 on Jun. 3, 2016, 5 pages.
First Office Action issued in related CN application 201380039915.7 on May 31, 2016, 17 pages.
The second Office Action for the equivalent Chinese patent application 201380039915.7 mailed on Feb. 3, 2017.

\* cited by examiner

Local Angles 920

Local Curvatures 930

3rd Component 943

SEISMIC ORTHOGONAL DECOMPOSITION ATTRIBUTE

RELATED APPLICATIONS

This application claims the benefit of U.S. Provisional Patent Application having Ser. No. 61/663,640, filed 25 Jun. 2012, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include providing seismic data for a subsurface region; decomposing at least a portion of the seismic data using principal component analysis (PCA) to generate at least one principal component; and outputting output data based at least in part on the at least one principal component. A system can include one or more processors for processing information; memory operatively coupled to the one or more processors; a provision module for providing seismic data for a subsurface region; a decomposition module for decomposing at least a portion of the seismic data using principal component analysis (PCA) to generate at least one principal component; and an output module for outputting output data based at least in part on the at least one principal component. One or more computer-readable storage media can include computer-executable instructions to instruct a computing system to: access seismic data for a subsurface region; decompose at least a portion of the seismic data using principal component analysis (PCA) to generate at least one principal component; and output output data based at least in part on the at least one principal component. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
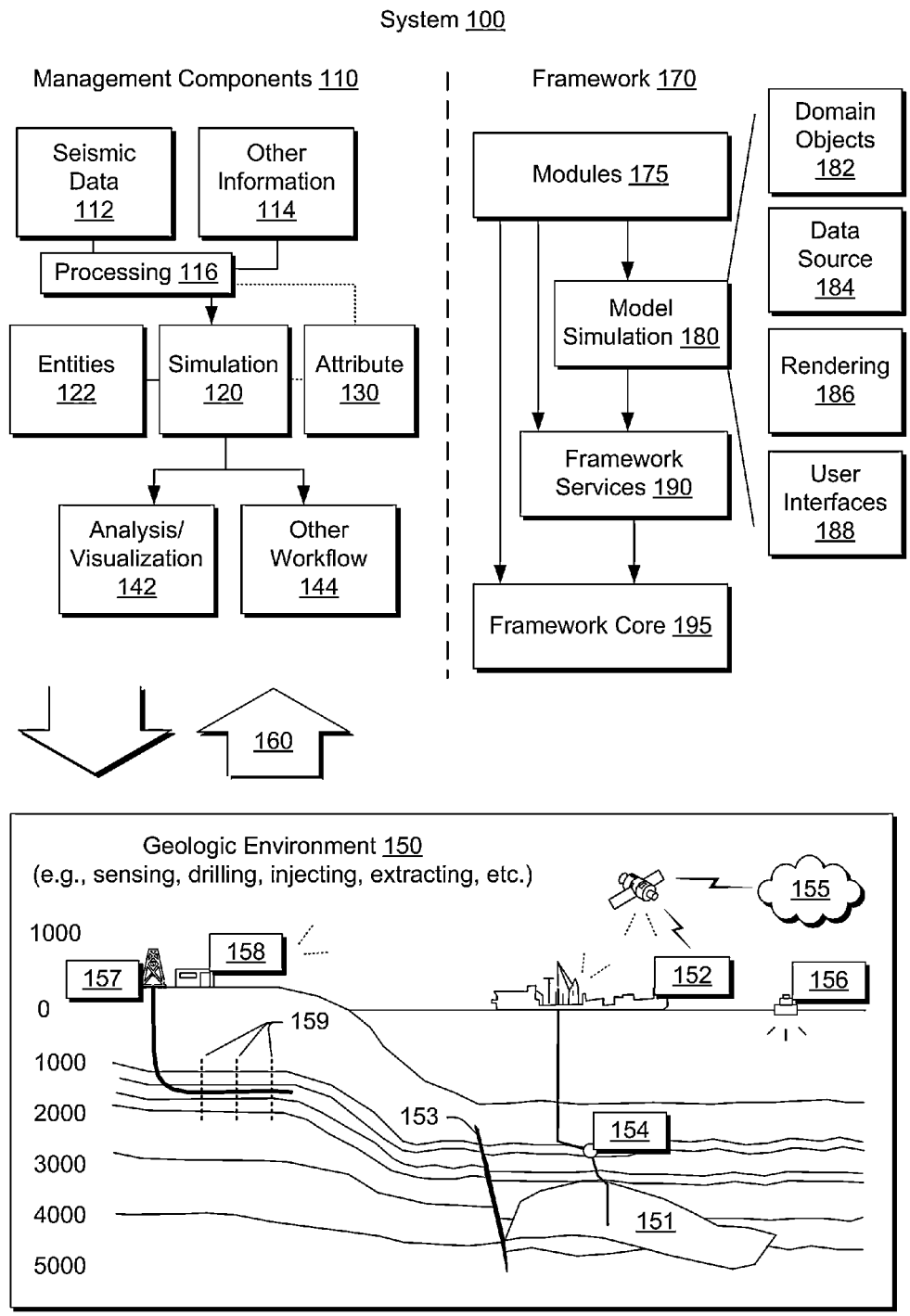
FIG. 1 illustrates an example system that includes various components for modeling a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

In various example embodiments, one or more orthogonal decomposition analyses may be applied to data such as seismic data, data derived from seismic data, etc. As an example, a method may include seismic surface (e.g., reflected horizon) orthogonal decomposition to detect features such as fractures, other latent structures, etc. As an example, seismic cube latent structure analyses may be implemented in a framework as a module, set of modules, etc., for example, to detect faults, fractures, and latent reflections. Where seismic data may include noise at a level to be considered "noisy", such analyses may particularly useful. As an example, one or more latent structure analyses may be performed to assist with detection of one or more features of interest in oil and gas exploration and production (E&P). For example, results from an analysis may assist with well placement, geologic modeling, sill analyses, detection of fractured zones or fracture corridors, and in E&P for unconventional resources and carbonate fields (e.g., consider shale fields).

Fracture corridors or subtle faults may give rise to seismic signals that may be exhibited in acquired seismic data as small-amplitude self-incoherent features, for example, in cross sections and as lineaments on slices or seismic surfaces. Detection of such features may include processing seismic signals, seismic data or both to generate one or more edge detection attributes, for example, where an attribute may be considered a measurable "property" of seismic data (e.g., consider amplitude, dip, frequency, phase, polarity, etc.). For example, an attribute may be a value or a set of values derived from seismic signals, seismic data, etc. and defined with respect to a coordinate system (e.g., one-dimensional, two-dimensional, three-dimensional, four-dimensional or of an even higher dimension). As an example, a dimension may be a spatial dimension, a time dimension, a frequency dimension, etc. As an example, consider providing seismic data as a "cube" where each voxel (volume element) in the cube has a value. In such an example, an edge detection algorithm may process the values in a cube to generate new values where the new values are referred to collectively as an edge detection attribute (e.g., an attribute cube).

As an example, a seismic cube (e.g., a seismic volume or seismic data for a volume) may be processed to generate an attribute cube (e.g., an attribute volume or attribute values for a volume). As another example, a seismic surface may be processed to generate an attribute surface. As yet another example, a seismic line may be processed to generate an attribute line. As an example, a seismic point may be processed to generate an attribute point.

Attributes may be derived, measured, etc., for example, at one instant in time, for multiple instances in time, over a time window, etc. and, for example, may be measured on a single trace, on a set of traces, on a surface interpreted from seismic data, etc. Attribute analysis may include assessment of various parameters, for example, as to a reservoir, consider a hydrocarbon indicator derived from an amplitude variation with offset (AVO) analysis.

As to latent structure detection in a seismic cube, on a seismic reflection surface, etc., various techniques have been applied such as those including local angle and azimuth angle; minimum, maximum, and Gaussian curvature; coherence; 3D curvatures; and spectral decomposition. The aforementioned techniques, when applied to fracture- and fault-detection, tend to be sensitive to noise in seismic data, acquisition footprint in seismic data or both noise and acquisition footprint in seismic data. While filtering or smoothing may be applied in an effort to eliminate noise and acquisition footprints in seismic data and to obtain more useful information about faults and fractures, such filtering or smoothing may suppress noise and acquisition footprints that include useful information about latent structures. In other words, filtering, smoothing, etc. of seismic data may "remove" or "diminish" small seismic data features (e.g., small in time, space or both time and space) that may be associated with faults, fractures, etc. (e.g., small seismic data features associated with seismic energy interacting with faults, fractures, etc.).

As to noise, it may arise from unwanted seismic energy, such as shot generation ground roll, surface waves, multiples, effects of weather, random occurrences in the Earth, seismology equipment, etc. Noise may exist as coherent noise, incoherent noise or other type of noise. As an example, coherent noise may appear as undesirable seismic energy artifacts with somewhat consistent phase from seismic trace to seismic trace (e.g., consider ground roll and multiples). As an example, incoherent noise, including random noise, may appear as disturbances in seismic data that lack coherence (e.g., lack a phase relationship between adjacent traces).

As to acquisition footprint, a footprint may refer to a region for which seismic data are acquired while an "acquisition footprint" may refer to artifacts that result from equipment, techniques, etc. used to acquire the seismic data. For example, for a region at sea, a footprint may be covered by an array of streamers towed by a vessel or vessels. In such an example, the spacing between streamers may be evidenced in seismic data as an acquisition footprint. For example, an acquisition footprint may appear as variations in properties of seismic data (e.g., encountered during processing) that are related to acquisition geometry and that may distort amplitude and phase of reflections.

As an example, consider seismic data where information about a structure (e.g., a fault, a fracture, etc.) exists within the data as high-frequency features in cross sections and as lineaments in slices or in seismic surfaces, which may lack coherence (e.g., to varying degree depending on one or more factors). As noise may include high-frequency characteristics and as information for acquisition footprint may exist as high-frequency artifacts within seismic data, approaches that aim to reduce the impact of noise and acquisition footprint within seismic data may also strip out at least a portion of the high-frequency features within the seismic data that are associated with a latent structure or latent structures.

As an example, a method can include detecting latent structure within seismic reflecting horizons via surface orthogonal decomposition, for example, using an algorithm based at least in part on principal component analysis (PCA), which may be referred to as, for example, Karhunen-Loeve decomposition (KLD) or proper orthogonal decomposition (POD). Such an approach may decompose information, for example, into a set of information where each member in the set is orthogonal to other members of the set. Using an image analogy, an image may be decomposed into a set of snapshots where each snapshot represents a collection of N measurements times a certain state variable. As an example for surface analysis, a snapshot may be defined for every node and include values for nodes inside some radius around this node, for example, where the radius is larger than the correlation radius of the autocorrelation function corresponding to the surface.

As an example, a method can include applying 3D orthogonal decomposition to a seismic cube flattened along a target layer to detect a fracture, a subtle fault, another latent feature, etc. As demonstrated in various trial examples, such an approach may be tolerant to noise. In particular, such an approach may be applied to seismic data that includes noise at a level high enough to classify the seismic data (or at least portions of it) as being noisy (e.g., in terms of signal-to-noise ratio, in terms of artifacts, in terms of randomness of energy, in terms of frequency, etc.).

As an example, an orthogonal decomposition may be performed using principal component analysis (PCA). For example, an orthogonal decomposition may be performed based on PCA to compute eigenvalues and eigenvectors of a 3D autocorrelation function of seismic data (e.g., a seismic cube, which may be an "original" seismic cube). In such an example, when applied to a seismic cube, each orthogonal component derived by the decomposition may also a cube (e.g., an orthogonal component attribute). As an example, where a seismic cube is decomposed into several orthogonal component cubes, the values within the orthogonal component cubes may sum to yield values approximately equal to the values of the seismic cube. For example, if a seismic cube includes 27 voxels (3×3×3) and a value in each of the 27 voxels, decomposition may generate about five cubes (e.g., attribute cubes) that each include 27 voxels and a value in each of the 27 voxels. When the values of center voxels the five cubes are summed, the resulting value may be approximately equal to the value of the center voxel of the seismic cube that was subjected to decomposition.

As to "orthogonality", in the context of orthogonal decomposition, it may indicate that the correlation coefficient between any two components derived from orthogonal decomposition of a seismic cube will be approximately zero. As an example, where the information in a seismic cube includes noise (e.g., consider random noise) and acquisition footprints that are lacking in their correlation with fractures or faults, reflections or other latent features, an orthogonal decomposition analysis may be applied to the seismic cube to "separate" the information into separate orthogonal components (e.g., decompose the information into data cubes where the data in any cube is lacking in its correlation with data in any other cube).

As an example, a method may include accessing or providing wellbore information, for example, to assist with selection of one or more orthogonal components for use in fracture detection. As an example, fault and fracture auto tracking technology such as ant-tracking may be applied to one or more selected orthogonal cubes, for example, to improve or enhance information (e.g., consider ant-tracking to generate a fracture image). As an example, detecting may include classifying, for example, where classification information (e.g., model information, results from previously analyzed data, etc.) may assist in detecting one or more features that may belong to a class of features (e.g., a type of feature).

Below, an example of a system is described followed by various technologies, including examples of techniques, which may, for example, include applying PCA to data to decompose information within the data into one or more components.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
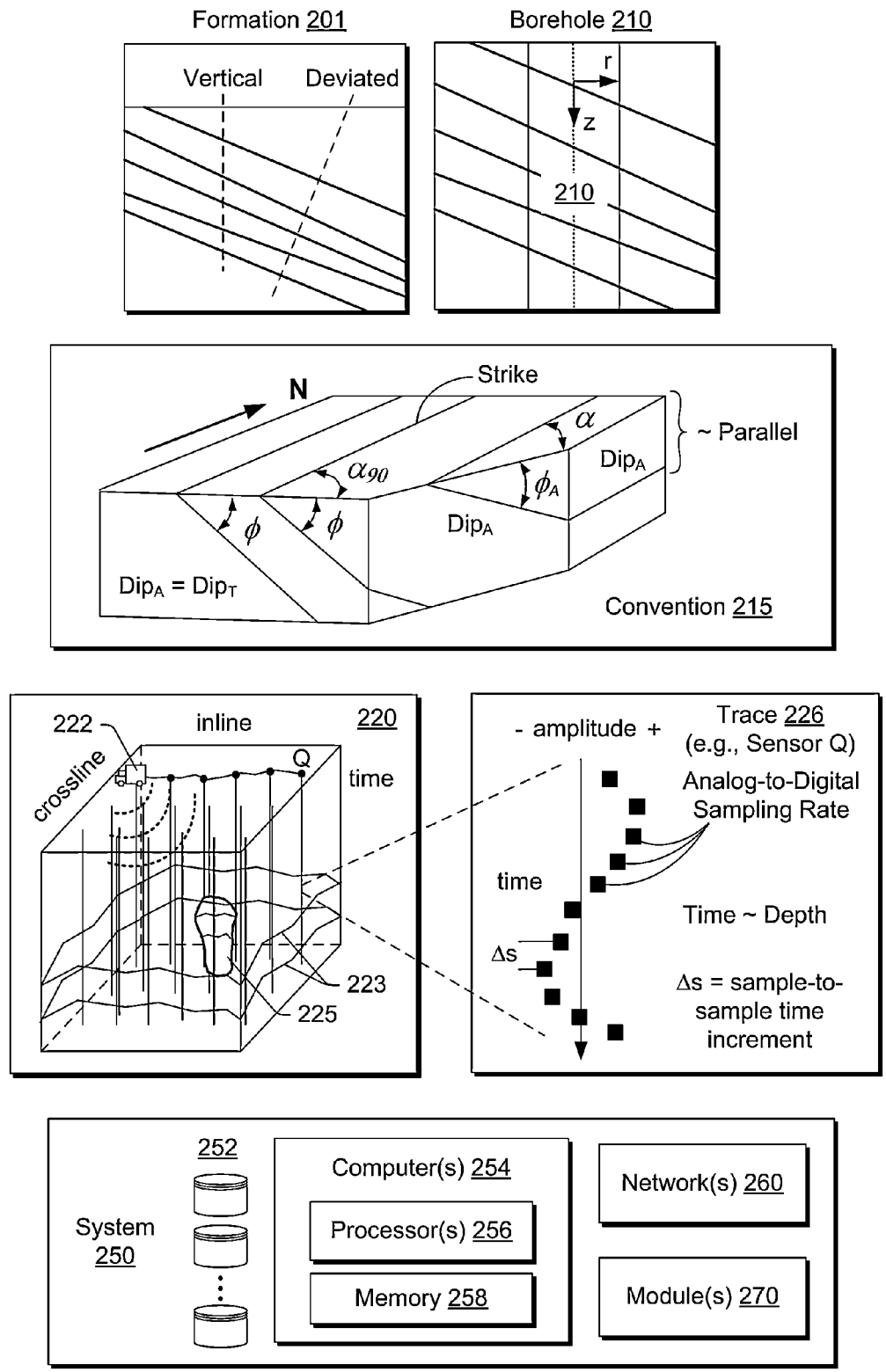
FIG. 2 illustrates examples of formations, an example of a convention for dip, an example of data acquisition, and an example of a system.

FIG. 2 shows an example of a formation 201, an example of a borehole 210, an example of a convention 215 for dip, an example of a data acquisition process 220, and an example of a system 250.

As shown, the formation 201 includes a horizontal surface and various subsurface layers. As an example, a borehole may be vertical. As another example, a borehole may be deviated. In the example of FIG. 2, the borehole 210 may be considered a vertical borehole, for example, where the z-axis extends downwardly normal to the horizontal surface of the formation 201.

As to the convention 215 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 215 of FIG. 2, various angles φ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 215 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 215 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 215 of FIG. 2, the dip of a plane as seen in a cross-section exactly perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 215 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 215 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in the diagram 220 of FIG. 2, a geobody 225 may be present in a geologic environment. For example, the geobody 225 may be a salt dome. A salt dome may be a mushroom-shaped or plug-shaped diapir made of salt and may have an overlying cap rock (e.g., or caprock). Salt domes can form as a consequence of the relative buoyancy of salt when buried beneath other types of sediment. Hydrocarbons may be found at or near a salt dome due to formation of traps due to salt movement in association evaporite mineral sealing. Buoyancy differentials can cause salt to begin to flow vertically (e.g., as a salt pillow), which may cause faulting. In the diagram 220, the geobody 225 is met by layers which may each be defined by a dip angle $\phi$.

As an example, seismic data may be acquired for a region in the form of traces. In the example of FIG. 2, the diagram 220 shows acquisition equipment 222 emitting energy from a source (e.g., a transmitter) and receiving reflected energy via one or more sensors (e.g., receivers) strung along an inline direction. As the region includes layers 223 and the geobody 225, energy emitted by a transmitter of the acquisition equipment 222 can reflect off the layers 223 and the geobody 225. Evidence of such reflections may be found in the acquired traces. As to the portion of a trace 226, energy received may be discretized by an analog-to-digital converter that operates at a sampling rate. For example, the acquisition equipment 222 may convert energy signals sensed by sensor Q to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

In the example of FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

In the example of FIG. 2, the one or more memory storage devices 252 may store seismic data for a geologic environment that spans kilometers in length and width and, for example, around 10 km in depth. Seismic data may be acquired with reference to a surface grid (e.g., defined with respect to inline and crossline directions). For example, given grid blocks of about 40 meters by about 40 meters, a 40 km by 40 km field may include about one million traces. Such traces may be considered 3D seismic data where time approximates depth. As an example, a computer may include a network interface for accessing seismic data stored in one or more of the storage devices 252 via a network. In turn, the computer may process the accessed seismic data via instructions, which may be in the form of one or more modules.

As an example, one or more attribute modules may be provided for processing seismic data. As an example, attributes may include geometrical attributes (e.g., dip angle, azimuth, continuity, seismic trace, etc.). Such attributes may be part of a structural attributes library (see, e.g., the attribute component 130 of FIG. 1). Structural attributes may assist with edge detection, local orientation and dip of seismic reflectors, continuity of seismic events (e.g., parallel to estimated bedding orientation), etc. As an example, an edge may be defined as a discontinuity in horizontal amplitude continuity within seismic data and correspond to a fault, a fracture, etc. Geometrical attributes may be spatial attributes and rely on multiple traces.

As mentioned, as an example, seismic data for a region may include one million traces where each trace includes one thousand samples for a total of one billion samples. Resources involved in processing such seismic data in a timely manner may be relatively considerable by today's standards. As an example, a dip scan approach may be applied to seismic data, which involves processing seismic data with respect to discrete planes (e.g., a volume bounded by discrete planes). Depending on the size of the seismic data, such an approach may involve considerable resources for timely processing. Such an approach may look at local coherence between traces and their amplitudes, and therefore may be classified in the category of "apparent dip."

As an example, a 2D search-based estimate of coherence may be performed for a range of discrete dip angles. Such an approach for dip analysis may estimate coherence using semblance, variance, principal component analysis (PCA), or another statistical measure along a discrete number of candidate dips and arrive at an instantaneous dip based on a coherence peak. As an example, a 3D search-based estimate of coherence, which may be analogous to a 2D approach, may use an inline vector and a crossline vector for time dip (e.g., along coherent peaks in inline and crossline directions). As an example, dip with maximum coherence may be stored as a dip angle/magnitude and dip direction/azimuth. As an example, an approach may involve human interaction in a semi-automated manner that includes interpretation of horizons in a subterranean formation via user identification and selection of horizon features.

As an example, a method can include orthogonal decomposition of a stratigraphically flattened 3D seismic cube. Such a method may decompose the cube into components that may be, for example, sorted according to their contribution to amplitude values of the cube. As an example, applying PCA to a seismic cube may generate eigenvalues for associated eigenvectors (e.g., orthogonal vectors) where the eigenvalues may be ordered from largest to smallest and referred to as individual components with respect to their order (e.g., first component, second component, etc.), which may relate to their contribution to amplitude values of the seismic cube.

As an example, a method may include assigning phenomena to different noncorrelated components (e.g., different seismic cubes). For example, such a method may include assigning to different noncorrelated cubes noise phenomena, acquisition footprint phenomena, one or more types of structural phenomena, etc. As an example, decomposition may separate out information, including high-frequency information, without losing information as would be lost by filtering or smoothing to diminish high-frequency noise. For example, filtering or smoothing to diminish high-frequency noise may also diminish high-frequency information. As an example, a method may include separating phenomena represented in seismic data on the basis of its shape. Such a method may separate the phenomena into components, which when summed may approximately reproduce the seismic data (e.g., present a composite of various shapes, noise, etc. in the data).

As an example, a method may include classifying components derived via orthogonal decomposition. Such a method may include calibration, for example, based in part on information about structures (e.g., fractures, faults, etc.) from one or more sources (e.g., well logs, seismic data, etc.). As an example, seismic data may include microseismic data, for example, acquired via microseismology. Microseismology may be applied for monitoring, assessing, etc. fractures generated via an artificial process such as hydraulic fracturing.

As an example, one or more components (e.g., principal components from a PCA analysis) may be processed. For example, a process that generates an ant-tracking attribute may be applied to a component (e.g., or a combination of several components) to improve an image as to visibility of one or more contiguous structures. As an example, ant-tracking data may be used for generating a model of a structure (e.g., as a stand-alone model or as part of a larger model that includes at least a portion of the structure).

As an example, a method may apply an orthogonal component analysis along stratigraphic layers (e.g., along seismic horizons). As an example, a method may apply an orthogonal component analysis along seismic slices, for example, to generate components that may illustrate edge effects such as edge effects that correspond to slice transitioning from one geological layer to another adjacent geological layer.

As an example, imagery such as surface imagery (e.g., satellite, geological, geophysical, etc.) may be processed using orthogonal decomposition. As an example, a method may analyze imagery using orthogonal decomposition to generate one or more components that may illustrate latent structure. As an example, components generated may form a noncorrelated set of images. As an example, a framework may access one or more components for surface imagery and may access one or more components for sub-surface seismic data and generate a three-dimensional representation (e.g., for visualization) of surface structure and sub-surface structure, which may be joined via an interpolation process or other process. For example, a latent structure may be captured by seismology and by satellite imagery and a model constructed based on an orthogonal decomposition analysis of seismic data and surface imagery (e.g., using components therefrom).

As an example, an orthogonal decomposition analysis may generate components where such components may be classified according to phenomena such as geological process phenomena. For example, one component may illustrate channels while another component may illustrate fractures, for example, based on such features being formed in part by at least one differing type of geological process. As an example, a method may include separating results of different geological processes that create orthogonal (uncorrelated) features in a seismic cube. As an example, a number of orthogonal decompositions may be performed on data where each of the orthogonal decompositions may include a different parameter value, for example, for a lag parameter or other parameter. Such an approach may optionally assist with tuning one or more orthogonal decomposition parameters, for example, with respect to latent features to be highlighted, detected, etc.

As an example, a method may include selecting a target layer from a plurality of layers. In such an example, where the selected layer is thin relative to seismic resolution (e.g., one or less of seismic cycles), the method may include performing 2D seismic surface analyses for the top or bottom of the layer.

As an example, a method may include performing an orthogonal decomposition analysis on data for detection of fracture corridors, for example, for unconventional resource exploration and for carbonate exploration under strong noise conditions.

As an example, a method can use 3D PCA to probe for hidden structure of a seismic cube by expanding noise and information in the seismic cube into orthogonal components, for example, based on the computation of eigenvalues and eigenvectors of a three-dimensional autocorrelation function of the seismic cube.

As an example, a method may decompose seismic data into orthogonal components (e.g., principal components) based at least in part on an autocorrelation function. For example, where the seismic data are provided as a volume (e.g., a seismic volume or seismic cube), a three-dimensional autocorrelation function may be applied locally (e.g., using a moving window defined by one or more parameters) as part of a process to decompose the seismic data into orthogonal components. In such an example, each orthogonal component may be a cube (e.g., spatially extensive with the seismic cube provided) and a sum of values of the components (e.g., at least several of the higher order components) may be approximately equal to values of the seismic cube provided.

As mentioned, orthogonality as to decomposed components means that the correlation coefficient between any two of the components will be about zero. As an example, where noise has little to no correlation with a fault, a reflection or other latent feature, such noise may stand out as a separate principal component (e.g., be separated out via application of orthogonal decomposition). As an example, one or more individual principal components may stand out for one or more footprints. As mentioned, a method may include applying orthogonal decomposition to separate results of different geological process, for example, which may be illustrated in several components as corresponding to orthogonal (un-correlated) features.

Figure 3:
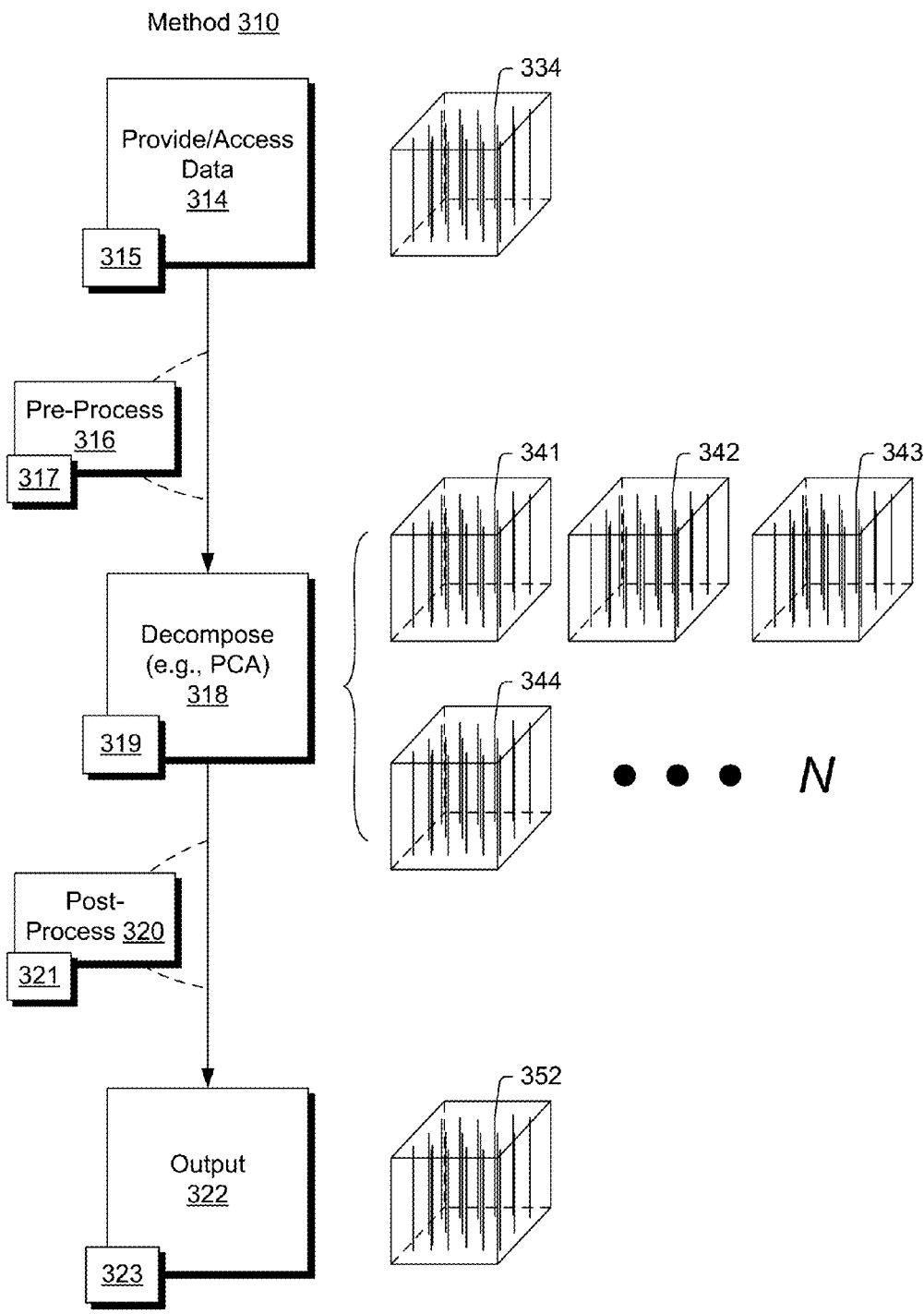
FIG. 3 illustrates an example of a method.

FIG. 3 shows an example of a method 310 that includes applying orthogonal decomposition to data. As shown, the method 310 includes a provision block 314 for providing data (e.g., or accessing data), a decomposition block 318 for decomposing the data using orthogonal decomposition into one or more components and an output block 322 for outputting information (e.g., output data) based at least in part on one of the one or more components.

As shown in the example of FIG. 3, the provision block 314 may provide seismic data as a seismic cube 334, the decomposition block 318 may decompose the seismic data into component cubes 341, 342, 343 and 344 (e.g., from one to N, where N may be an integer of at least one) and the output block 322 may output information 352 based at least in part on one of the component cubes 341, 342, 343 and 344.

As an example, the method 310 may include one or more of a pre-process block 316 for pre-processing at least a portion of the provided data (e.g., or accessed data) and a post-process block 320 for post-processing at least a portion of one or more components. The pre-process block 316 may be implemented, for example, depending on the characteristics of the data provided or accessed. For example, where the provision block 314 provides "raw" seismic data, at least a portion of that data may be processed. As an example, a pre-process performed by the pre-process block 316 may include autocorrelation to generate autocorrelation data (e.g., an autocorrelation cube or autocorrelation volume). As an example, the provision block 314 may provide data as autocorrelation data. In the example of FIG. 3, the post-process block 320 may be implemented, for example, depending on a goal of a workflow. For example, where latent structure such as fractures are to be examined (e.g., uncovered from data), a post-process performed by the post-process block 320 may include ant-tracking to generate ant-tracking data (e.g., an ant-tracking cube or ant-tracking volume). While ant-tracking is mentioned as an example, one or more other techniques may be applied to at least a portion of a component (e.g., or portions of components, etc.).

As an example, ant-tracking may be performed as part of a workflow, which may include, for example, performing orthogonal decomposition (e.g., PCA) on data and then generating ant track data, from which, for example, features may be extracted (e.g., patches). In turn, such features may be subject to one or more of validation, editing or other process. Ant-tracking may generate an ant-tracking attribute, an ant-tracking surface, an ant-tracking volume (e.g., or cube), etc.

Ant-tracking may include using an algorithm that by analogy, involves "ants" finding the shortest path between their nest and their food source (e.g., by communicating using pheromones to attract other ants). In such an example, the shortest path becomes marked with more pheromones than longer paths such that subsequent ants are more likely to choose the shortest path, and so on.

Where features may be latent (e.g., latent structure), for example, due to noise, acquisition footprint, etc., performing PCA prior to ant-tracking may enhance the ability to track the latent features, particularly where the features have some amount of continuity (e.g., contiguous within a surface, a volume, etc.). For example, fractures generated by a fracturing process (e.g., consider hydraulic fracturing) tend to be relatively small (e.g., compared to faults) and contiguous. Noise, acquisition footprint, etc. may exist within data to thereby make seismic signals associated with the fractures "latent".

The method 310 is shown in FIG. 3 in association with various computer-readable media (CRM) blocks 315, 317, 319, 321 and 323. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 310. As an example, a computer-readable medium (CRM) may be a computer-readable storage medium (e.g., a non-transitory medium).

As an example, a method can include providing seismic data for a subsurface region that includes a reflector; decomposing at least a portion of the seismic data using principal component analysis (PCA) to generate at least one principal component; and outputting output data based at least in part on the at least one principal component. In such a method, seismic data may be provided (e.g., or accessed) as autocorrelation data (e.g., where seismic data has been processed using an autocorrelation algorithm). As an example, a method may include generating autocorrelation data for at least a portion of seismic data.

As an example, output data may be a principal component (e.g., a cube of values, etc.), which may optionally be enhanced via one or more processes (e.g., image processing, ant-tracking, etc.). As an example, output data may optionally include information from more than one principle component from a PCA. As an example, output data may optionally include information from multiple PCAs (e.g., performed on data using one or more different parameter values, pre-processing techniques, etc.).

As an example, a reflector may be associated with a fracture. As an example, seismic data may include noise, an acquisition footprint or both. As an example, a method may generate at least one principal component that includes a principal component orthogonal to another principal component that includes noise. As an example, a method may generate at least one principal component that includes a principal component orthogonal to another principal component that includes indicia of an acquisition footprint (e.g., an acquisition footprint artifact, etc.). As an example, a method may include generating at least one principal component that includes a principal component orthogonal to another principal component that includes noise and orthogonal to yet another principal component that includes indicia of an acquisition footprint. As an example, a classification scheme may classify principal components As an example, a method can include performing ant-tracking on at least a portion of a principal component. For example, ant-tracking may be performed on a portion of a principal component, portions of multiple principal components, etc. As an example, a method can include outputting ant-tracking data based at least in part on performing ant-tracking.

As an example, a subsurface region may include shale. As an example, a subsurface region may include or be a layer and, for example, include at least a portion of a reflector (e.g., a reflector that intersects the layer). As an example, a reflector may be a reflector of a fracture, for example, where the fracture may have been generated by a hydraulic fracturing process (e.g., optionally using proppant). As an example, a method may include performing a fracturing process on a subsurface region based at least in part on output data from a PCA. As an example, a subsurface region may include multiple reflectors associated with artificial fractures in the subsurface region.

As an example, one or more computer-readable storage media can include computer-executable instructions to instruct a computing system to: access seismic data for a subsurface region that includes a reflector; decompose at least a portion of the seismic data using principal component analysis (PCA) to generate at least one principal component; and output output data based at least in part on the at least one principal component. In such an example, instructions may be provided to instruct a computing system to autocorrelate data to generate autocorrelation data.

As an example, in the method 310, the decomposition block 318 may include principal component analysis (PCA), for example, to calculate eigenvectors and eigenvalues of an autocorrelation function applied to data (e.g., provided data, accessed data, pre-processed data, etc.). As an example, where the data is provided as a seismic cube, it may be decomposed into orthogonal components, which may be referred to as orthogonal cubes. In such an example, the orthogonal cubes may be sorted by their contribution to the total variance (e.g., amplitude) of the provided seismic cube.

As an example, an autocorrelation function may be applied to seismic data, for example, where a 3D autocorrelation function calculates correlation factors between the seismic data and a representation of that seismic data shifted spatially. For example, for a provided seismic cube, a 3D autocorrelation may represent the seismic cube shifted in different directions (e.g., inline, crossline and trace) as well as lags. In such an example, a process may be considered to be a multi-attribute process where the attributes present the same shifted cube. For example, such a process may obtain the attributes by reading values of a provided seismic cube using a moving 3D window (e.g., a sub-cube or sub-volume).

While cross-correlation is a statistical measure that may compare two signals as a function of a time shift (lag) between them, autocorrelation involved comparing a signal to itself, for example, for a variety of time shifts (lags), which may assist with detection of repeating periods within signals. As an example, an autocorrelation function may be normalized so that its maximum value at zero lag is 1 (e.g., where the signal is not shifted as to lag and correlated with itself). As an example, a method may apply a maximum lag criterion (or maximum lag criteria), for example, where maximum lag may be approximately equal to or greater than a feature to be detected (e.g., where a lag or lags are based at least in part on one or more estimated, expected and/or known feature dimensions).

As an example, PCA may be described mathematically with respect to the following equation:

$$\Lambda = \Phi^T C \Phi$$

where C is the covariance matrix for a multidimensional vector X.

In the foregoing equation, C is an autocorrelation function of seismic data according to one or more predefined maximum lags and $\Phi$ is the matrix of eigenvectors that are orthogonal to each other, and $\Lambda$ is the diagonal matrix of eigenvalues.

In PCA, eigenvectors that correspond to principal components are uncorrelated, which may be otherwise stated as the components being orthogonal. In PCA, the eigenvector corresponding to the maximum eigenvalue of the covariance matrix may be referred to as the first principal component (e.g., first component). As an example, depending on data analyzed, the first component may correspond to background and be considered a background factor.

As an example, the following equation may be implemented for analyzing seismic data provided as a seismic cube:

$$O_{ijk}^r = \frac{\lambda^r (S_{max} - S_{min})}{NML\sqrt{\lambda^r}} \sum_{n=-N/2}^{N/2} \sum_{m=-M/2}^{M/2} \sum_{k=-L/2}^{L/2} \frac{(S_{i+n,j+m,k+l} - S_{avr})}{(S_{max} - S_{min})} \phi_{n,m,l}^r$$

where $o_{ijk}^r$ is r orthogonal component for i, j trace and k sample on the cube, where $s_{i+n,j+m,k+l}$ is seismic sample values for i, j trace and k sample on the cube, where n, m, l are lags in i, j and k directions, where N, M, L are maximum lags and where $s_{avr}$, $s_{max}$ and $s_{min}$ are average, maximum, and minimum cube amplitude values correspondingly. In the foregoing equation, $\lambda^r$ and $\phi_{n,m,l}^r$ are the r eigenvalue and the r eigenvector, respectively.

According to the foregoing equations for $\Lambda$ and $o_{ijk}^r$, a method may include calculating a set of orthogonal (non-correlated) cubes where, for example, when summed, the resulting value may be approximately equal to those of the provided seismic cube.

A method may include calibrating, accessing calibration information, etc. For example, calibrating may provide for classifying information, noise, etc. For example, one or more components may be classified based on calibration information, which may result from training data, etc.

A method may include classifying to classify one or more components. For example, a classified component may belong to a noise class, a footprint class, a fracture class, a fault class, etc. Classification may label a component as being an attribute, for example, where a component of a fracture class is labeled as a fracture attribute. As an example, individual components or multiple components may be processed to perform classification or to provide output (e.g., one or more results).

As an example, as to a comparison process, multiple orthogonal cubes may be compared with other information about fractures, such as microimager measurements in wellbores or microseismic interpretation results.

As mentioned, the first component from a PCA may be associated with background. For example, trial data demonstrate that a first principal component may account for up to about 70% to about 95% of the variance of a provided seismic cube and reflect a main trend of amplitudes of the provided seismic cube. As an example, where noise has no correlation with faults or other latent features in a seismic cube, the noise may stand out as one or more separate principal components (e.g., separate from background, separate from latent structure, etc.). As an example, one or more individual principal components may represent one or more footprints. As an example, where a provided seismic cube is separated into a noise component, a footprint component and another component, summation of the components may approximate the provided seismic cube. As an example, where more components are separated from provided seismic data, a summation of those components may more closely approximate provided the seismic data.

An analogy may exist for PCA in Fourier analysis, for example, if a source cube or surface includes features like "spikes" or "steps," PCA may create a long set of orthogonal components with approximately equal amplitudes akin to a "white spectrum". In such a scenario, source data may not be considered as corresponding to a "sparse signal" (e.g., with a limited spectrum); accordingly, resulting components may be challenging to interpret. As an example, for seismic data for seismic slices (e.g., that slice across multiple stratigraphic layers, features, etc.), if the orthogonal decomposition analysis is fulfilled along seismic slices, it may intersect several different layers that may create an edge that is akin to a spike or step feature and PCA may create a long set of orthogonal components with similar amplitude, which may challenge classification or other analysis.

As an example, a method may apply orthogonal decomposition to one or more stratigraphic slices where a stratigraphic slice may be defined as being within a crossline and inline plane with a corresponding depth window. As an example, for a stratigraphic slice, seismic amplitude may be within a span that is less than that for a seismic slice (e.g., a slice in a plane that is defined by a depth or time dimension). In such an example, seismic amplitude may be represent latent structural features in a manner amenable to orthogonal decomposition, for example, where such features may be represented by a few orthogonal components, which, in turn, may be more readily classified (e.g., interpreted).

As an example, a method may apply orthogonal decomposition to a relatively thin layer, which may be defined with respect to data as being less than approximately one seismic cycle. In such an example, a two-dimensional orthogonal decomposition technique may be applied to, for example, a top or bottom of the layer or, for example, a three-dimensional technique and a two-dimensional technique may be applied (e.g., to generate more stable results).

Figure 4:
FIG. 4 illustrates an example of a method with respect to data.
Figure 4:
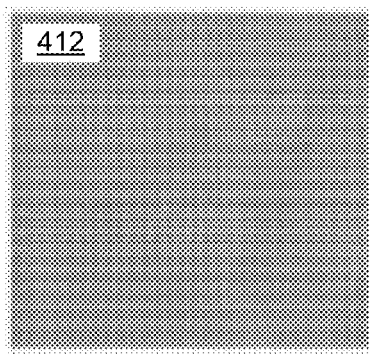
Figure 4:
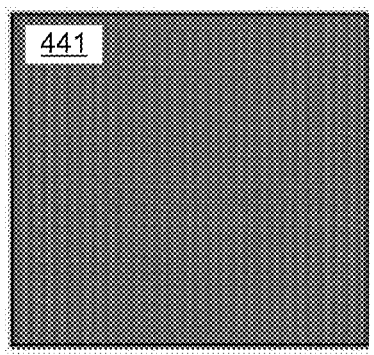
Figure 4:
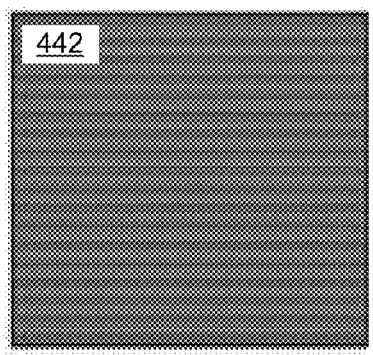
Figure 4:
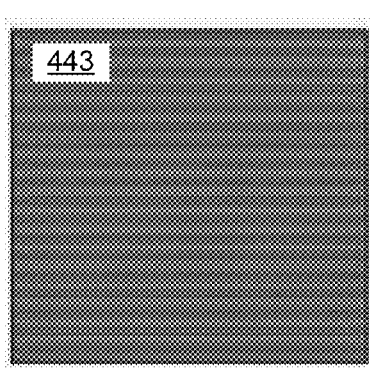
Figure 4:
Figure 4:
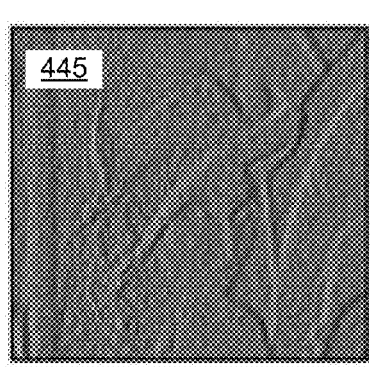
Figure 4:
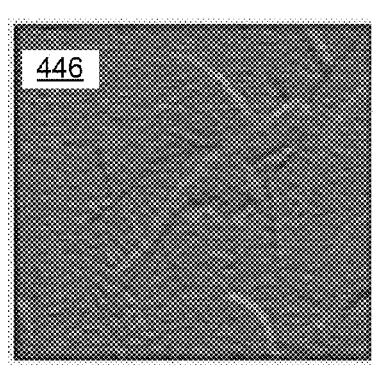

FIG. 4 shows an example of PCA applied to two dimensional data. In the example of FIG. 4, orthogonal decomposition was applied to provided trial data 411, a 512×512 pixel, 256 level grayscale image ("Lenna"), which includes a mixture of detail, flat regions, shading and texture. To demonstrate PCA in the presence of noise and high-amplitude vertical and horizontal footprints, synthetic data 412 (at a 1000 level) were introduced into the trial data 411. The combined trial data 411 and synthetic data 412 were then processed using PCA to generate principal components, which include first through sixth principal components presented as images 441, 442, 443, 444, 445 and 446.

As shown in the example of FIG. 4, the fourth component 444 restores much of the trial data 411 and the fifth and sixth components 445 and 446 demonstrate edge detection for the trial data 411 in the presence of the synthetic data 412.

Figure 5:
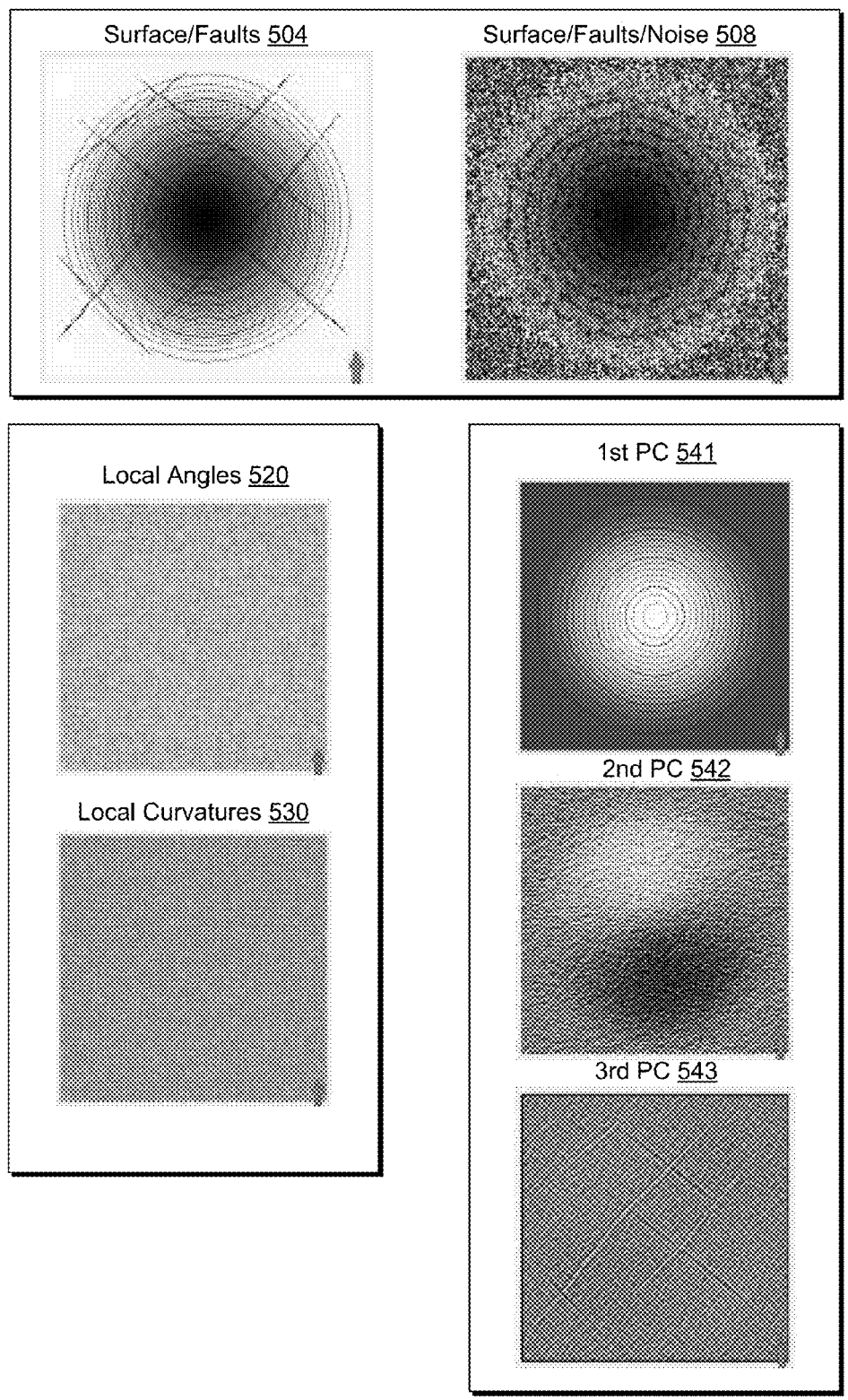
FIG. 5 illustrates an example of a method with respect to data.

FIG. 5 shows an example of trial data processed using PCA, for example, to demonstrate an ability to detect small-amplitude seismic signals generated by fracturing under strong noise and footprint artifacts. In the example of FIG. 5, surface and fault data 504 were mixed with noise to generate trial data 508 (e.g., a sum of predefined cubes with trend, noise, footprint, and signal). Specifically, faults were added to the surface with amplitude of about $\frac{1}{1000}$ of the surface amplitudes. In the data 504 and 508, counters lines indicate amplitude increments.

To demonstrate how PCA may compare with a local angle calculation technique and a minimum curvature calculation technique, the data 508 were processed to calculate local angles, resulting in the data 520, and the data 508 were processed to calculate minimum curvatures, resulting in the data 530 while PCA was applied to the data 508 to generate first component data 541, second component data 542 and third component data 543. In the example of FIG. 5, the first component data 541 restores the surface without noise while the second and third components 542 and 542 reproduce faults on the surface. In contrast, the local angles data 520 and the minimum curvatures data 530 fail to exhibit the details shown in the component data.

Figure 6:
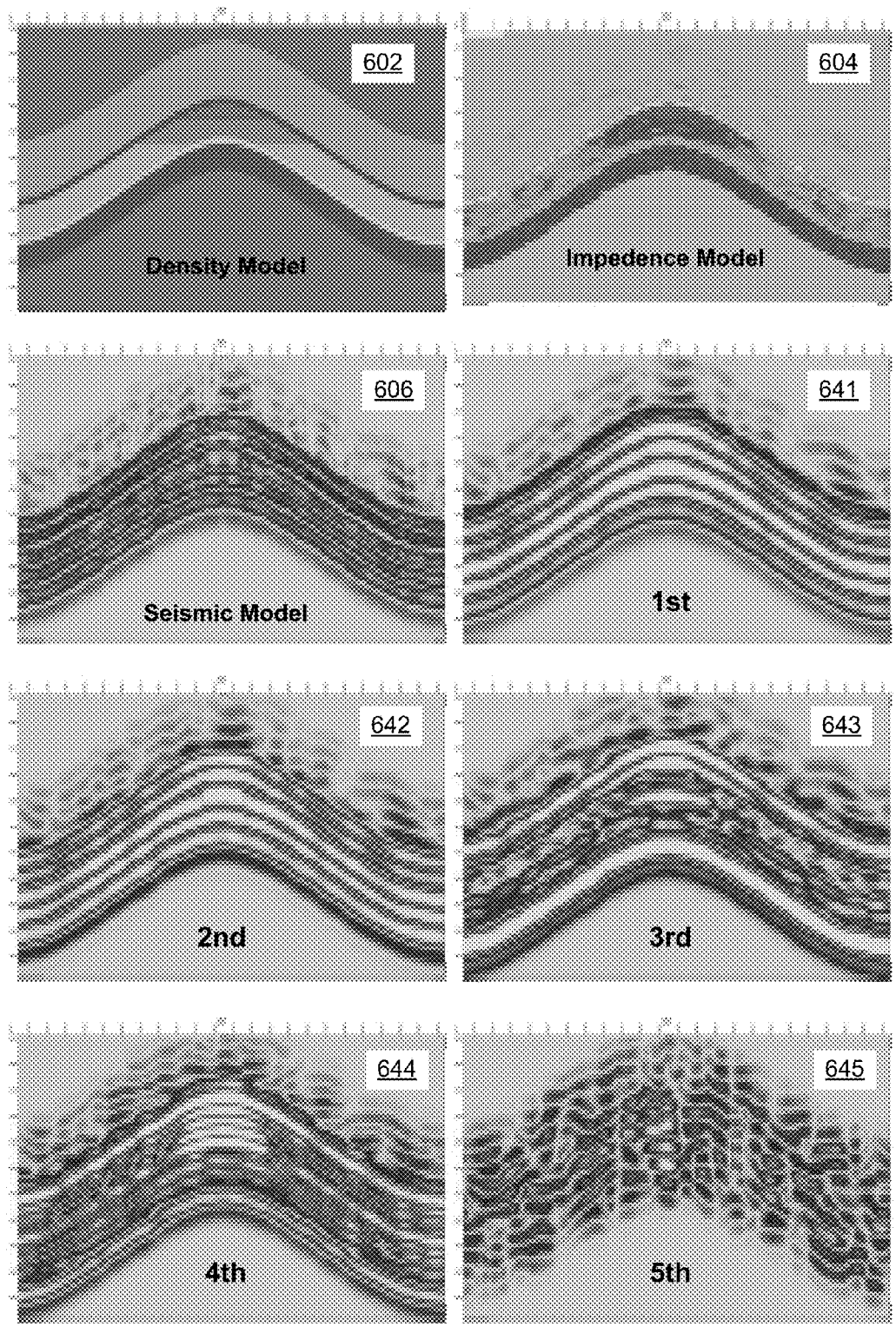
FIG. 6 illustrates an example of a method with respect to data.

FIG. 6 shows an example where PCA was applied to 3D data. In the example of FIG. 6, data 602 corresponds to a cross section of a symmetric 3D density source model that includes an intermediate layer with gas-oil and oil-water interfaces and data 604 corresponds to an acoustic impedance model, according to the data 602 with noise. In FIG. 6, data 606 corresponds to a seismic model calculated from the acoustic impedance model data 604 based on a convolution equation with an approximately 30 Hz Ricker wavelet (e.g., a zero-phase wavelet with a central peak and smaller side lobes).

In applying PCA to the data 606, first, second, third, fourth and fifth components 641, 642, 643, 644 and 645 were generated (e.g., by decomposition of the data 606). Table 1, below, shows average amplitudes for the components 641, 642, 643, 644 and 645. As indicated, latent reflections for gas-oil and oil-water interfaces are illustrated in the third component 643 while the fifth component 645 illustrates uncorelated noise.

TABLE 1

Data for Components 641, 642, 643, 644 and 645.

| | | |
|---|---|---|
| PC1 % = 42.7339 | Sum % = 42.7339 | amplitude = 0.2417800307 |
| PC2 % = 41.0545 | Sum % = 83.7883 | amplitude = 0.2322782447 |
| PC3 % = 3.3812 | Sum % = 87.1695 | amplitude = 0.0191302633 |
| PC4 % = 2.0896 | Sum % = 89.2591 | amplitude = 0.0118225379 |
| PC5 % = 1.8679 | Sum % = 91.1270 | amplitude = 0.0105679792 |

Figure 7:
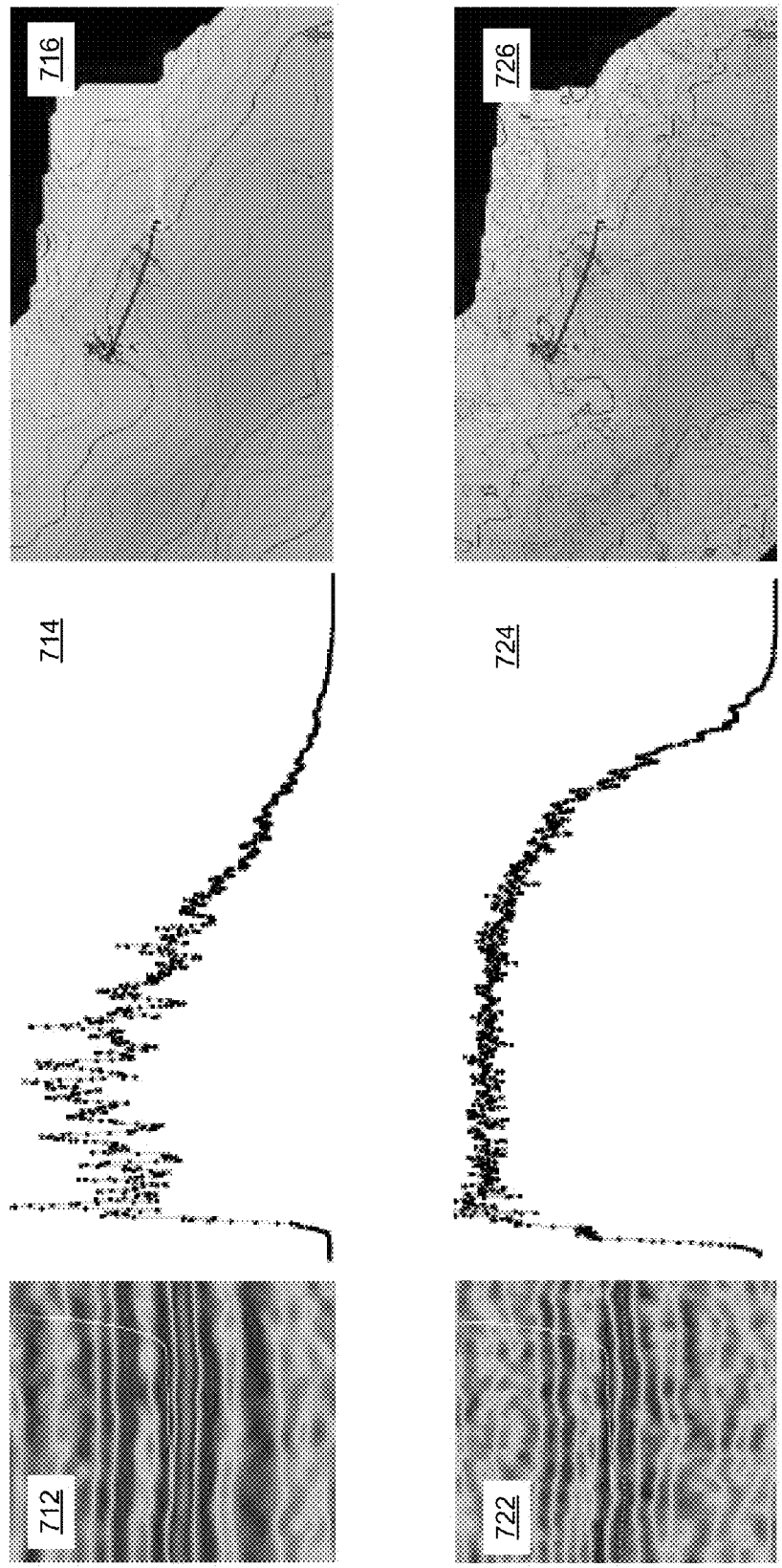
FIG. 7 illustrates an example of a method with respect to data.

FIG. 7 shows data 712, 714, 716, 722, 724 and 726 to demonstrate application of PCA to unconventional resources exploration. For example, in gas shales and oil shales, it may be challenging to detect faults and fractures via seismic data, which may be noisy land seismic data. In the example of FIG. 7, to get an unsmoothed surface, a whitening procedure was applied to a source seismic cube and auto-tracking was used to get an unsmoothed surface for analyses. In FIG. 7, data 712 correspond to a seismic cross section, data 714 correspond to an amplitude spectrum of provided source seismic data, data 716 correspond to a top of shale surface according to the provided source seismic data, data 722 correspond to the provided seismic data after whitening, data 724 correspond to an amplitude spectrum after whitening, and data 726 correspond to the top of shale according to the provided seismic data after whitening.

Figure 8:
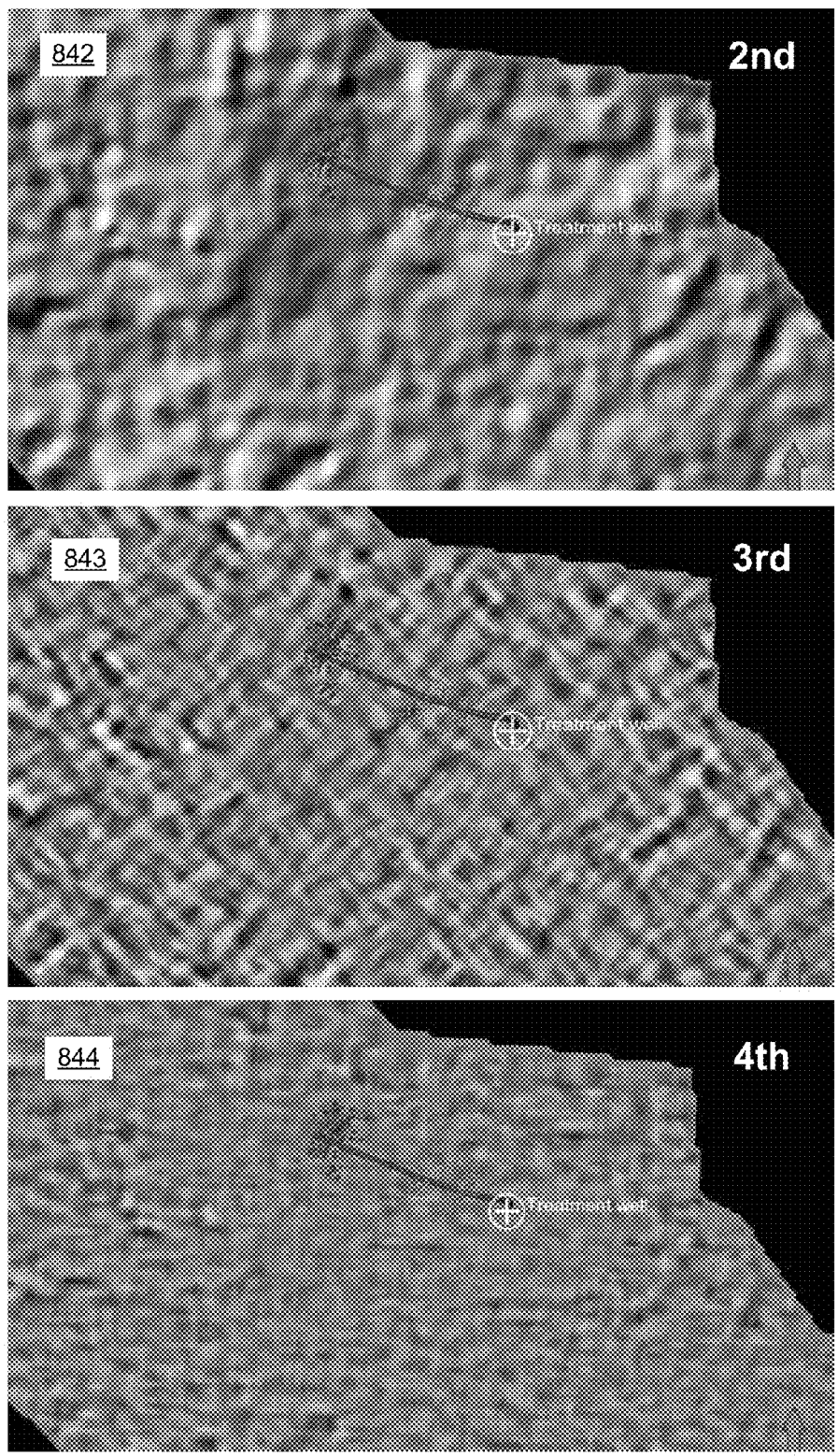
FIG. 8 illustrates an example of methods with respect to data.

FIG. 8 shows results from application of PCA to data of FIG. 7. For example, FIG. 8 shows a second component 842, a third component 843 and a fourth component 844 (e.g., noise and footprint). FIG. 8 also shows microseismic data results for the shale layer.

Figure 9:
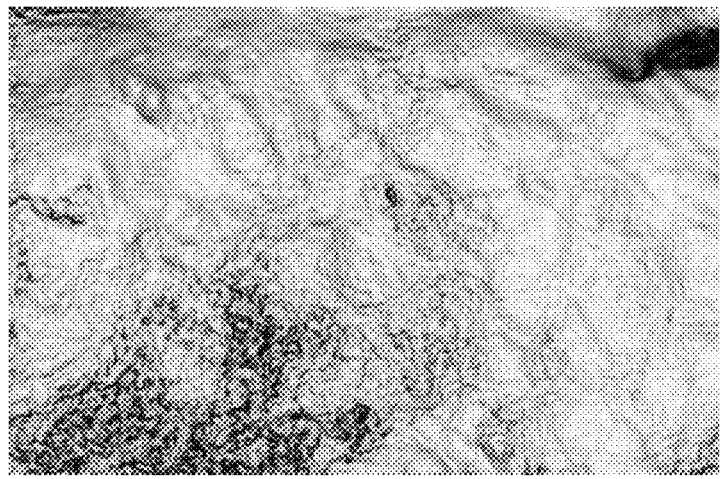
FIG. 9 illustrates an example of methods with respect to data
Figure 9:
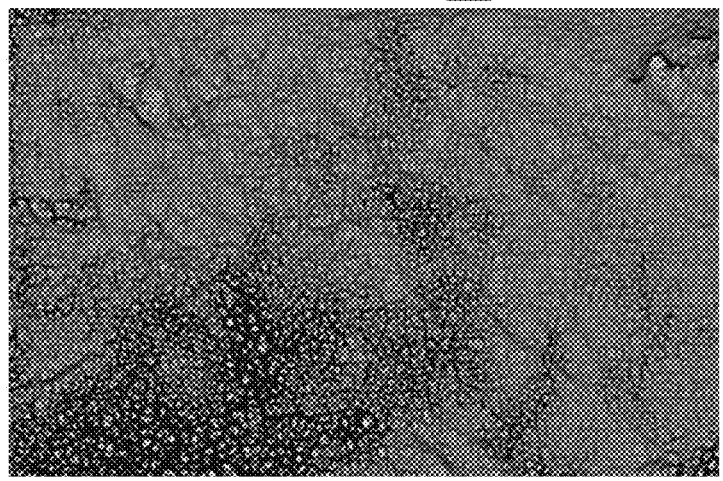
Figure 9:
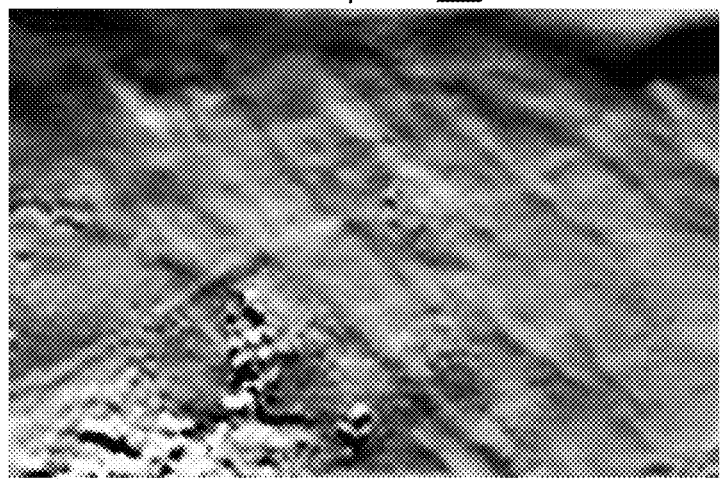

FIG. 9 shows data for a carbonate example. In particular, FIG. 9 shows results of analyses of a provided seismic data surface calculated at the top of carbonates using local angles 920, minimum curvatures 930 and a third component 943 from PCA. In the example of FIG. 9, the third component 943 illustrates lineaments, which may be explained, for example, as fracture corridors.

Figure 10:
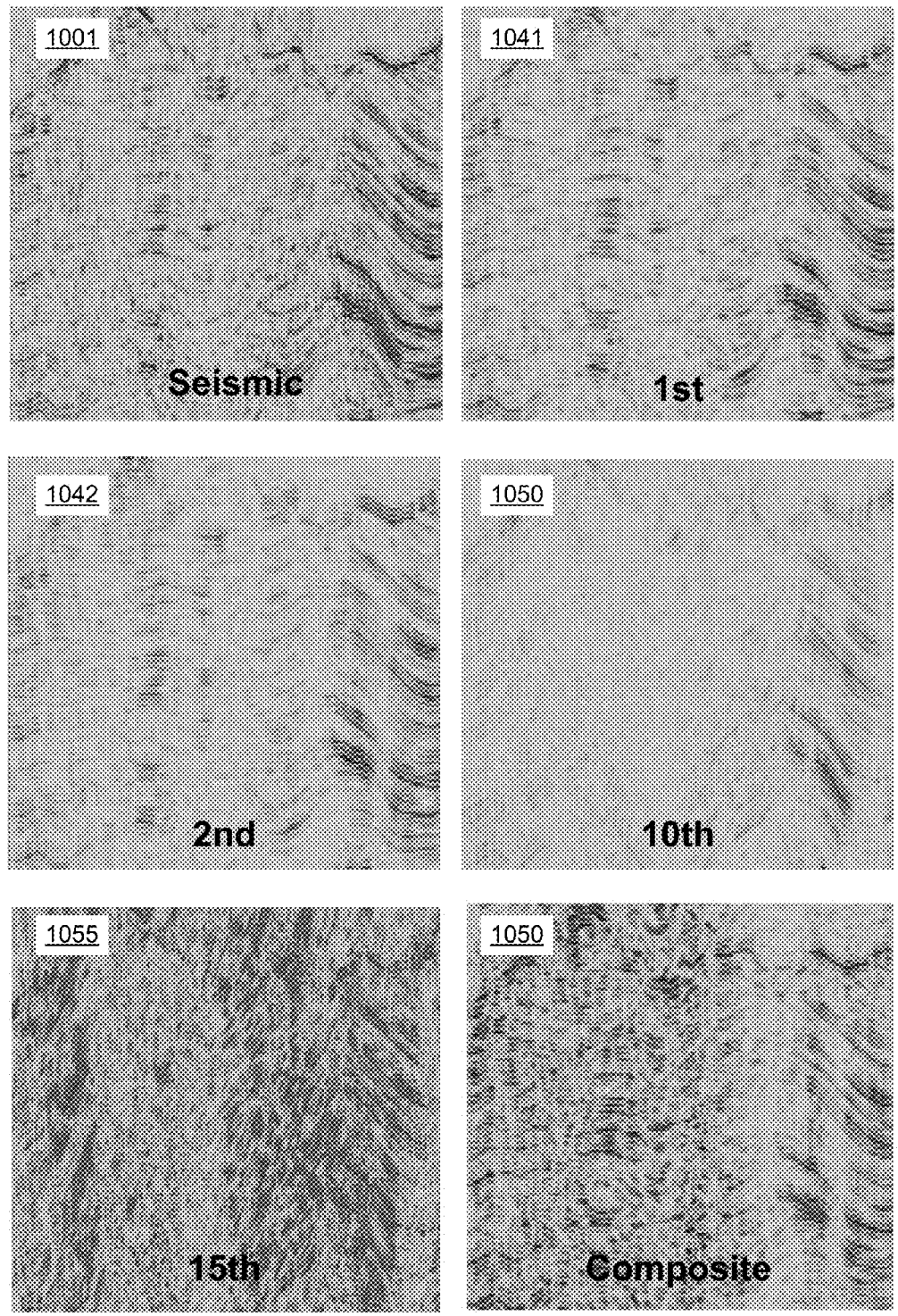
FIG. 10 illustrates an example of a method with respect to data.

FIG. 10 shows data for a deep water latent reflection detection example. In the example of FIG. 10, data 1001 corresponds to a seismic cross section with deep water under salt reflections. In the data 1001, the reflections are not prominent and include some residual staff (e.g., after performing a migration procedure). Further, the data 1001 include noise. A workstep that involves horizon picking may be challenging given the data 1001.

PCA was applied to the data 1001 to generate components that include a first component 1041, a second component 1042, a tenth component 1050 and a fifteenth component 1055. In the example of FIG. 10, composite data 1060 are also shown. As to quality of the data, the first component 1041 and the second component 1042 may qualitatively and/or quantitatively be considered to be "good" data; whereas, the tenth component 1050 and the fifteenth component 1055 may qualitatively and/or quantitatively be considered to be "not good" data as a near 45 degree reflection artifact may be classified as a type of artifact that results from application of a residual staff after migration procedure.

As to the composite data 1060, from 25 components, 7 were classified as "good" and combined by summation to produce the composite data 1060. The composite data 1060 (e.g., a multicomponent composite attribute) exhibit continuous reflections, which may, for example, facilitate horizon picking, horizon tracking, etc.

Figure 11:
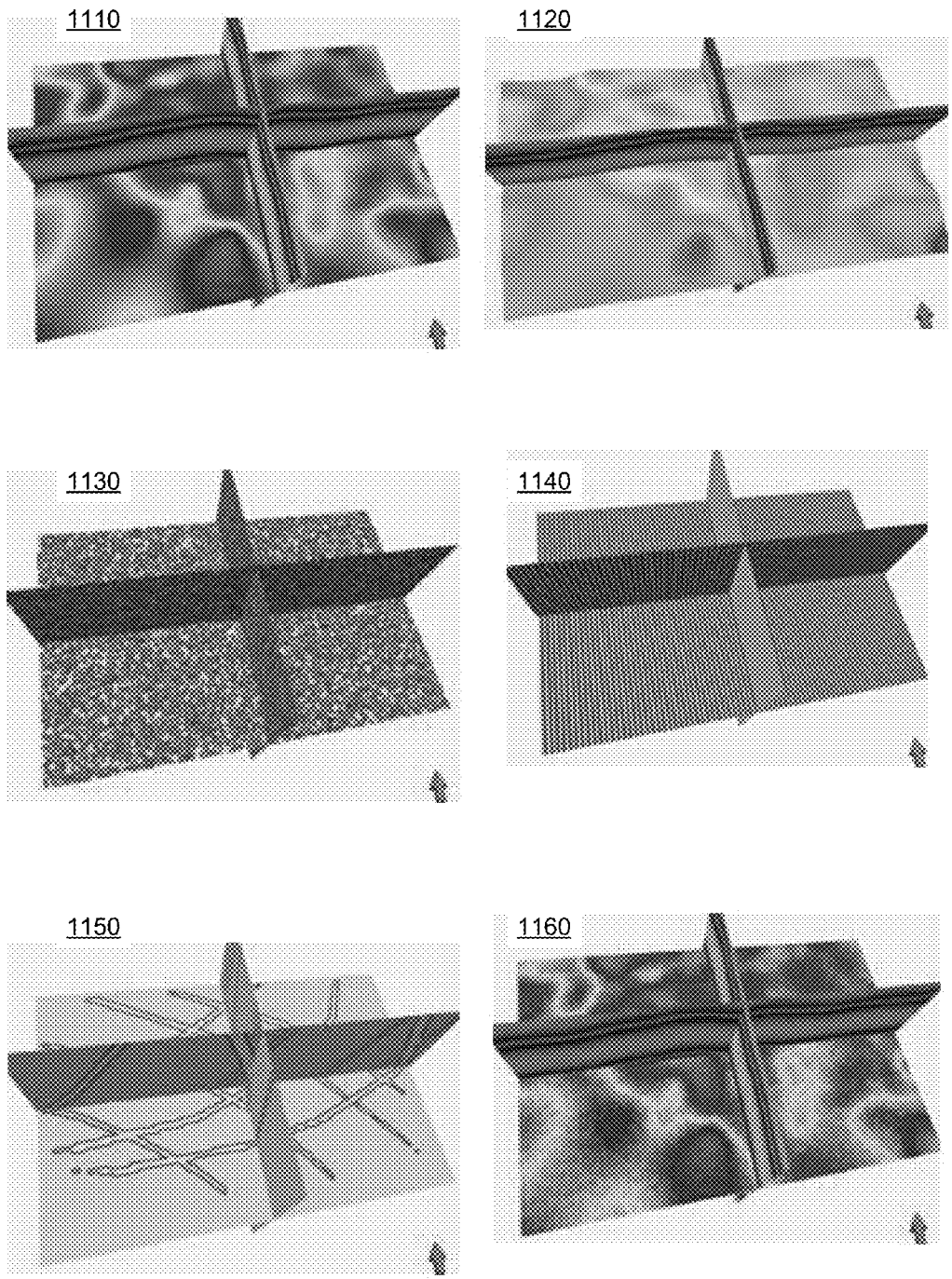
FIG. 11 illustrates an example of a method with respect to data.

FIG. 11 shows data including trend data 1110, surface data 1120 used to create the trend data 1110, noise data 1130, acquisition footprint data 1140, fracture data 1150 and summed data 1160 of the trend data 1110 (50 units), the noise data 1130 (3 units), the acquisition footprint data 1140 (3 units) and the fracture data 1150 (1.5 units).

More particularly, the trend data 1110 represent a seismic cube that was used as a trend where the trend was made via the surface data 1120, which were convoluted with a low-frequency sinusoid. To generate the summed data 1160, which may be considered a synthetic cube, a summation of data was performed using the trend data 1110 (e.g., a trend cube) with amplitude of about 50 units, the noise data 1130 (e.g., a noise cube) with amplitude of about 3 units, the acquisition footprint data 1140 (e.g., an acquisition footprint cube) with amplitude of about 3 units, and the fracture data 1150 (e.g., a "fracture corridors" cube) with amplitude of about 1.5 units (e.g., shown as a non-vertical model).

Figure 12:
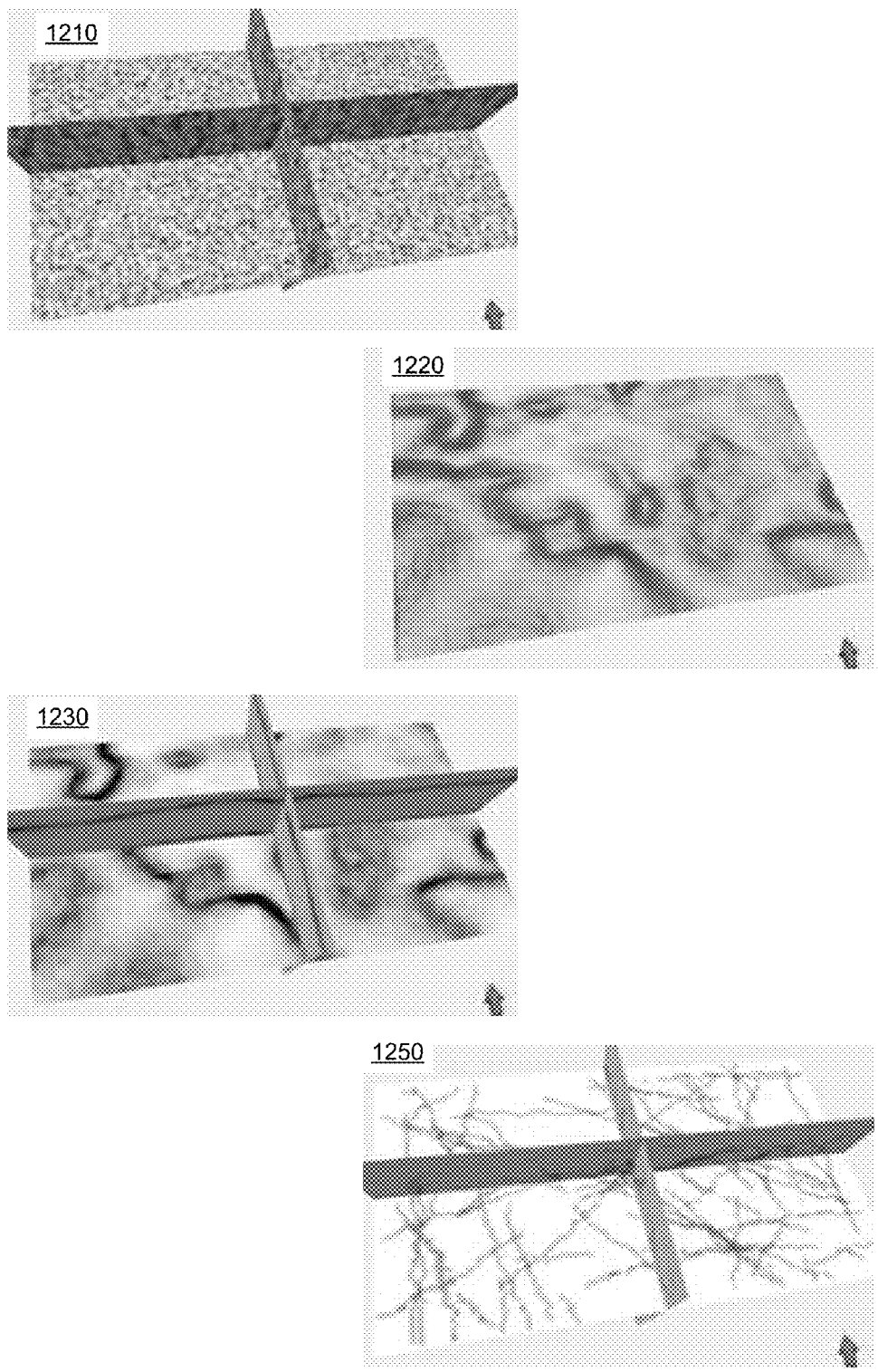
FIG. 12 illustrates an example of a method with respect to data

FIG. 12 shows examples of various attributes calculated from the summed data 1160 of FIG. 11, which may be considered a synthetic model. In particular, FIG. 12 shows a 3D curvatures attribute 1210, an "amplitude contrast" attribute (slice) 1220, a variance attribute 1230 and an ant-tracking attribute 1250 (e.g., calculated via the variance attribute 1230). In the examples of FIG. 12, the attributes fail to adequately detect a useful signal given noisy conditions (see, e.g., the noise data 1130 of FIG. 11). For example, the fracture data 1150 of FIG. 11 is not readily observable in the ant-tracking attribute 1250 of FIG. 12. Of the attributes of FIG. 12, the "amplitude contrast" attribute 1220 (e.g., an "amplitude contrast" cube) was reviewed and found to exhibit a relatively small footprint of the target signal (see the fracture data 1150 of FIG. 11) on a few separate slices.

Figure 13:
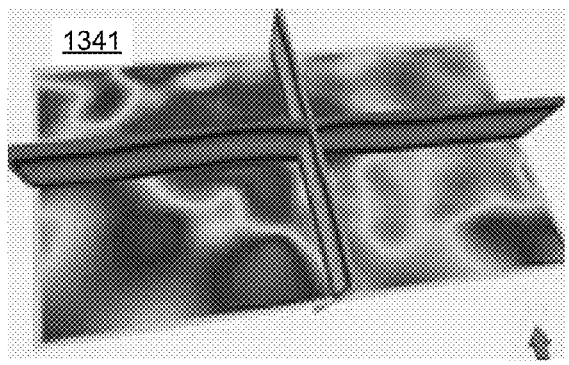
FIG. 13 illustrates an example of a method with respect to data.
Figure 13:
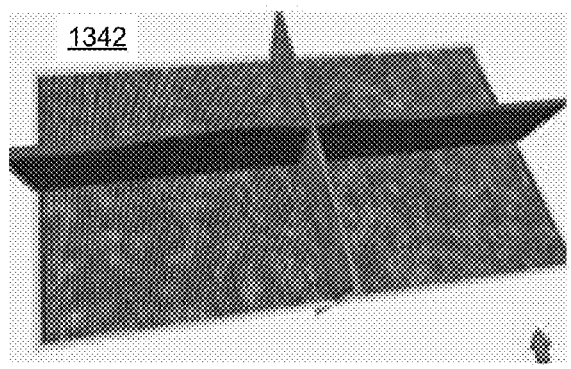
Figure 13:
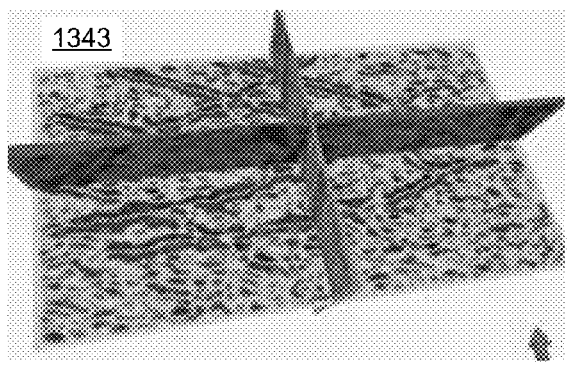
Figure 13:
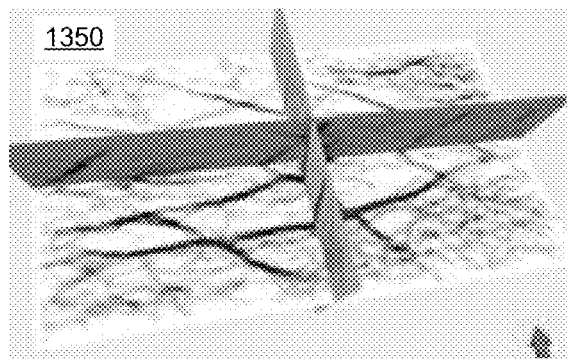

FIG. 13 shows results of orthogonal decomposition of the synthetic model as represented by the summed data 1160 of FIG. 11. Specifically, FIG. 13 shows the first component 1341, the second component 1342, the third component 1343 and an ant-tracking attribute 1350 calculated using the third component 1343.

The orthogonal decomposition results obtained through seismic cube 3D analyses along the layer defined by the trend surface (the trend data 1110 per the surface data 1120). As shown in FIG. 13, the first component 1341 restores the trend and the second component 1342 restores the acquisition footprint. As to the third component 1343, it shows a very clear signal from modeled fractures (the fracture data 1150). The results also demonstrated that other components may show noise. As to the ant-tracking attribute 1350 calculated using the third component 1343, it detects (e.g., uncovers) the latent structure (the fracture data 1150) with more detail and accuracy than the ant-tracking workflow result of FIG. 12, i.e., the ant-tracking attribute 1250, which was based on the variance data 1230.

Figure 14:
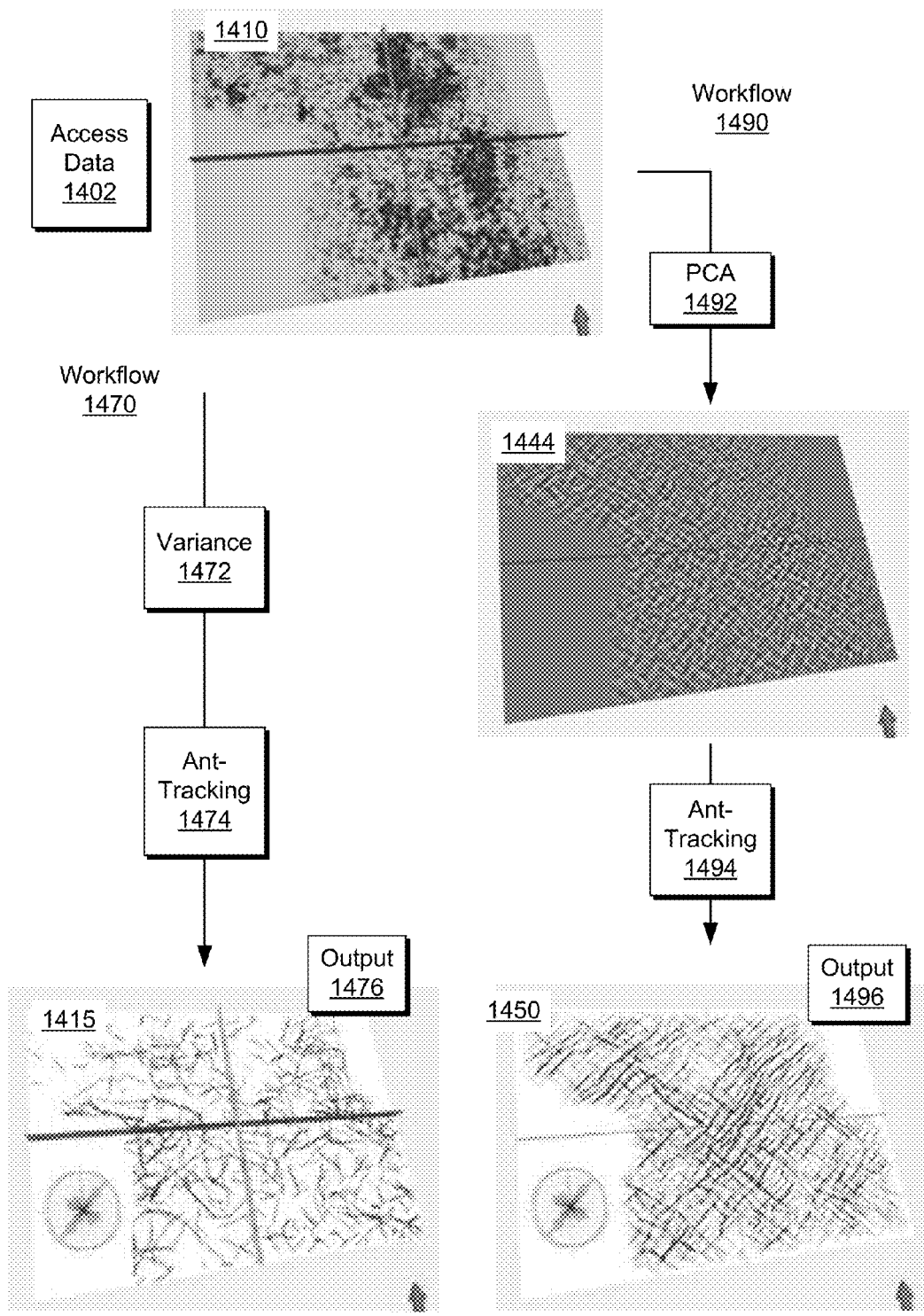
FIG. 14 illustrates examples of workflows with respect to data.
Figure 15:
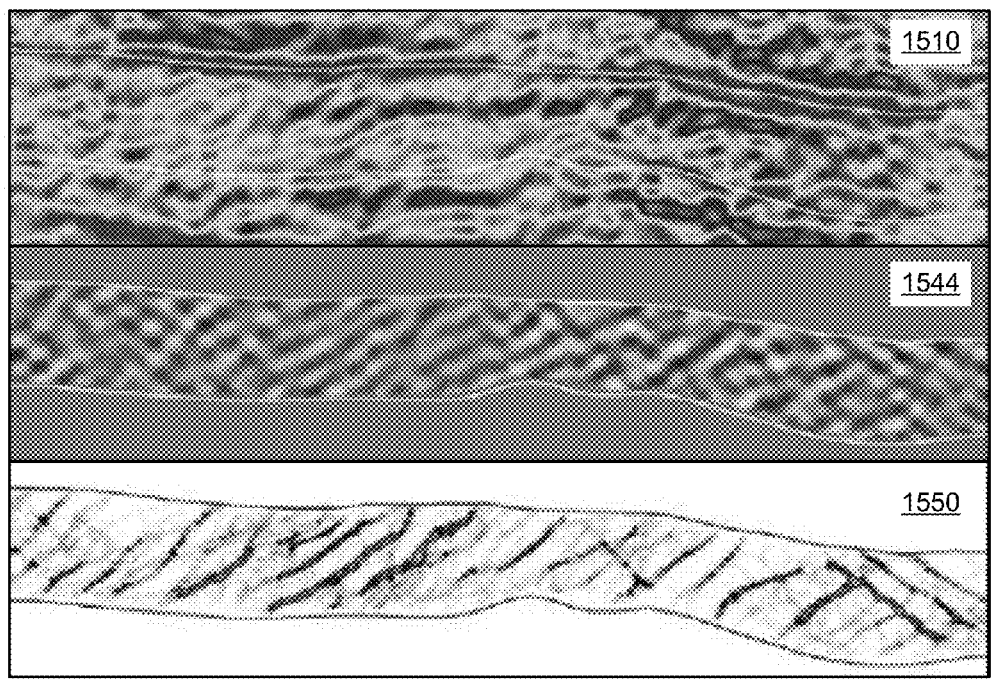
FIG. 15 illustrate an example of data associated with an example of a workflow.

FIGS. 14 and 15 show examples of processing a dataset from the Avalon shale, an unconventional shale play in the Delaware basin in New Mexico. FIG. 14 shows two workflows 1470 and 1490 that include accessing data 1402, which access the data 1410. The workflow 1470 includes generating a variance attribute 1472 followed by generating an ant-tracking attribute 1474 to produce an output 1476, which is shown as data 1415 (e.g., a slice from the ant-tracking attribute). The workflow 1490 includes generating components using PCA 1492, for example, where one of the components 1444 is shown, which is the fourth component and may be considered to be an individual component attribute. As an example, the fourth component 1444 may be selected based at least in part on a detection scheme that may include classifying one or more components (e.g., using a model, a knowledge base, etc.). In the example of FIG. 14, the workflow 1490 includes generating an ant-tracking attribute 1494 using one of the components, for example, the fourth component 1444, to produce an output 1496, which is shown as data 1450 (e.g., a slice from the ant-tracking attribute).

As an example, the data 1415 may be compared to the data 1450. Such a comparison demonstrates that, while the data 1415 (ant-tracking results calculated on a variance attribute) look "geological", they do not correspond well to the fracture direction calculated from the image results; whereas, the data 1450 (ant-tracking results calculated on the fourth orthogonal component) look very continuous and correspond well to the fracture directions observed from images in a well in the cube (e.g., the data 1410).

FIG. 15 shows cross-sectional data 1510, 1544 and 1550 that correspond to the data 1410, 1444 and 1450 of FIG. 14. The data 1550 show non-vertical fracture direction, which corresponds with the seismic data 1510 (e.g., seismic cross section from the center west-east section).

Figure 16:
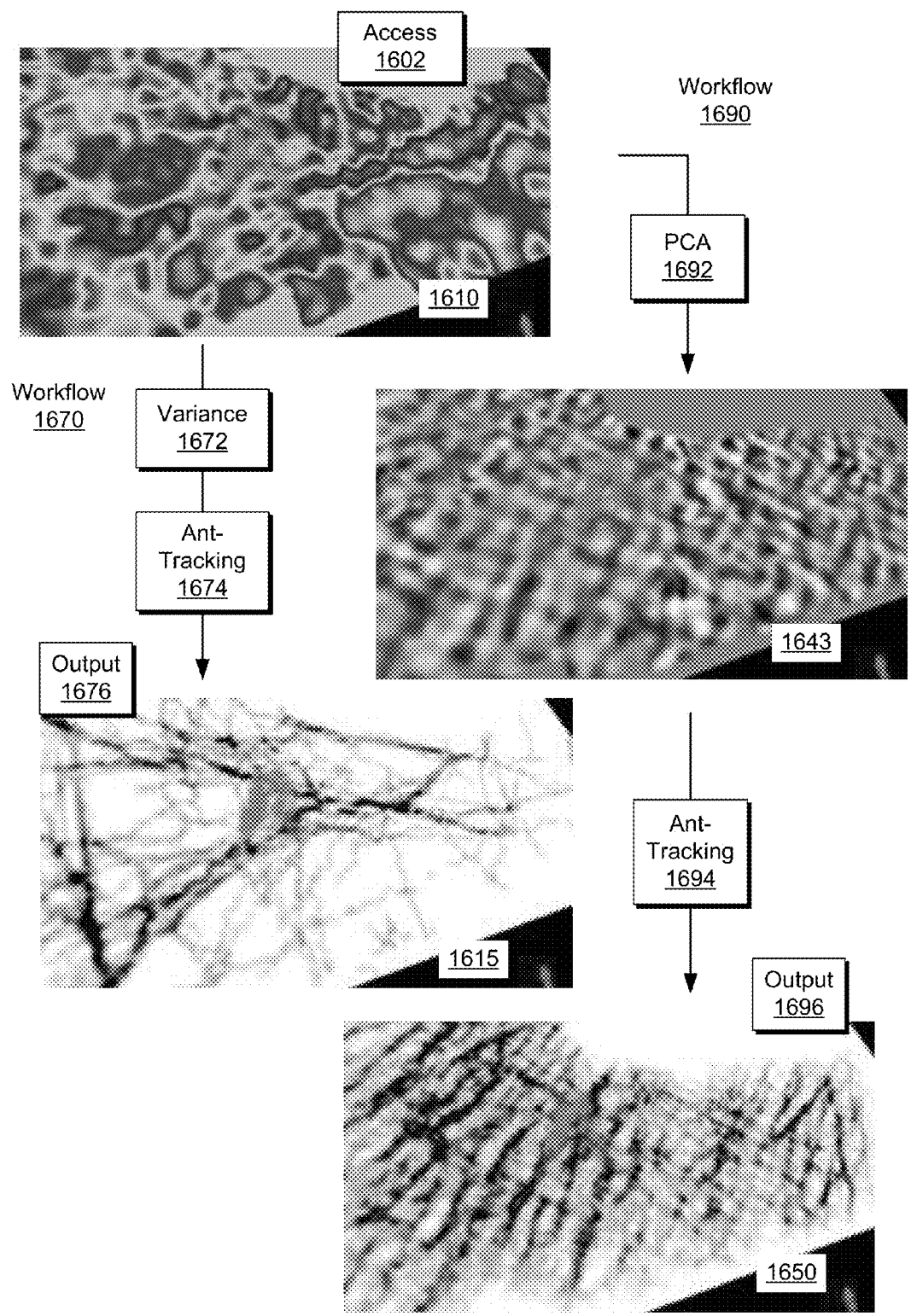
FIG. 16 illustrates examples of workflows with respect to data.

FIG. 16 shows examples of processing data from the Barnett shale field, which is a geological formation located in the Bend Arch-Fort Worth Basin. In particular, FIG. 16 shows two workflows 1670 and 1690 that include accessing data 1602, which accesses the data 1610. The workflow 1670 includes generating a variance attribute 1672 followed by generating an ant-tracking attribute 1674 to produce an output 1676, which is shown as data 1615 (e.g., a slice from the ant-tracking attribute). The workflow 1690 includes generating components using PCA 1692, for example, where one of the components 1643 is shown, which is the third component and may be considered to be an individual component attribute. As an example, the third component 1643 may be selected based at least in part on a detection scheme that may include classifying one or more components (e.g., using a model, a knowledge base, etc.). In the example of FIG. 16, the workflow 1690 includes generating an ant-tracking attribute 1694 using one of the components, for example, the third component 1643, to produce an output 1696, which is shown as data 1650 (e.g., a slice from the ant-tracking attribute).

In FIG. 16, the data 1615, 1643 and 1650 are shown with colors that indicate different stages of microseismic events, for example, resulting from fracturing processes implemented to generate fractures. As an example, during fracture generation, microseismology may be performed to acquire seismic data for microseismic events. As an example, a method may include analyzing data generated from a PCA to assess fractures generated by a fracturing process, to plan a fracturing process, etc. For example, planning may include assessing results of one or more stages to plan one or more subsequent stages (e.g., as to locations, process parameters, etc.).

As an example, the data 1615 may be compared to the data 1650. Such a comparison demonstrates that, while the data 1615 (ant-tracking results calculated on a variance attribute) can detect major faults in the region, they lack detail around minor faults as well as fractures (e.g., faults having sizes less than those of the major faults); whereas, the ant-tracking attribute (e.g., the data 1650) calculated on the third orthogonal component 1643 identifies more faults and fractures, for example, including fractures that correspond to microseismic events (see, e.g., the colored markings that represent microseismic events for various stages).

Figure 17:
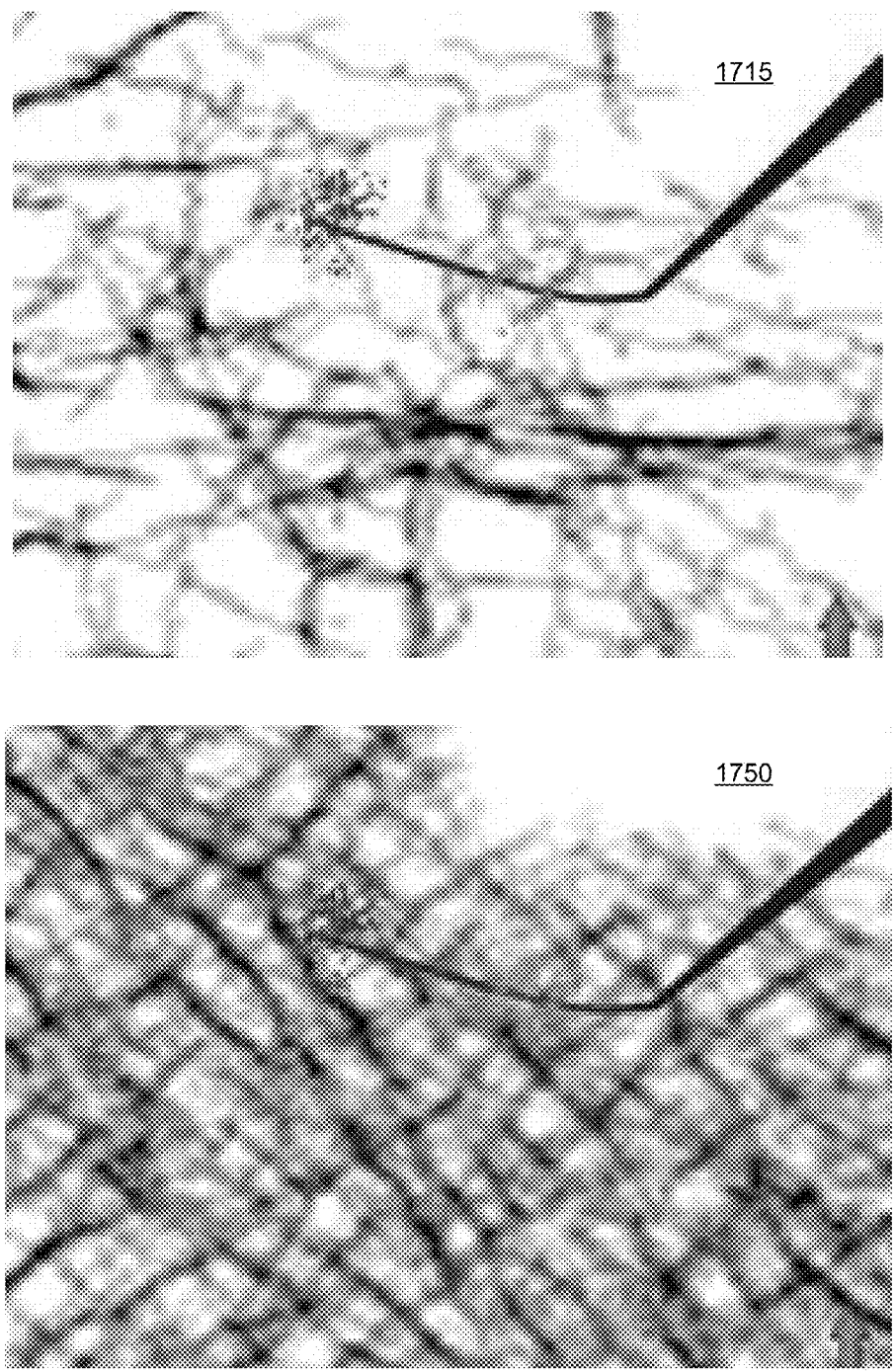
FIG. 17 illustrates a comparison of data for the workflows of FIG. 16.

FIG. 17 shows results from examples of processing data from the Montney Formation, which is a stratigraphical unit of Lower Triassic age in the Western Canadian Sedimentary Basin in British Columbia and Alberta. In particular, FIG. 17 shows data 1715, which are a slice from an ant-tracking attribute applied to a variance attribute, and data 1750, which are a slice from an ant-tracking attribute using a component generated from a PCA (e.g., the fourth component).

In FIG. 17, the data 1715 and 1750 are shown with colors that indicate different stages of microseismic events, for example, resulting from fracturing processes implemented to generate fractures. As an example, during fracture generation, microseismology may be performed to acquire seismic data for microseismic events. As an example, a method may include analyzing data generated from a PCA to assess fractures generated by a fracturing process, to plan a fracturing process, etc. For example, planning may include assessing results of one or more stages to plan one or more subsequent stages (e.g., as to locations, process parameters, etc.).

As an example, the data 1715 may be compared to the data 1750. Such a comparison demonstrates that, while the data 1715 (ant-tracking results calculated on a variance attribute) can detect major faults in the region, they lack detail around minor faults as well as fractures (e.g., faults having sizes less than those of the major faults); whereas, the ant-tracking attribute (e.g., the data 1750) calculated on the fourth orthogonal component identifies more faults and fractures, for example, including fractures that correspond to microseismic events (see, e.g., the colored markings that represent microseismic events for various stages).

Figure 18:
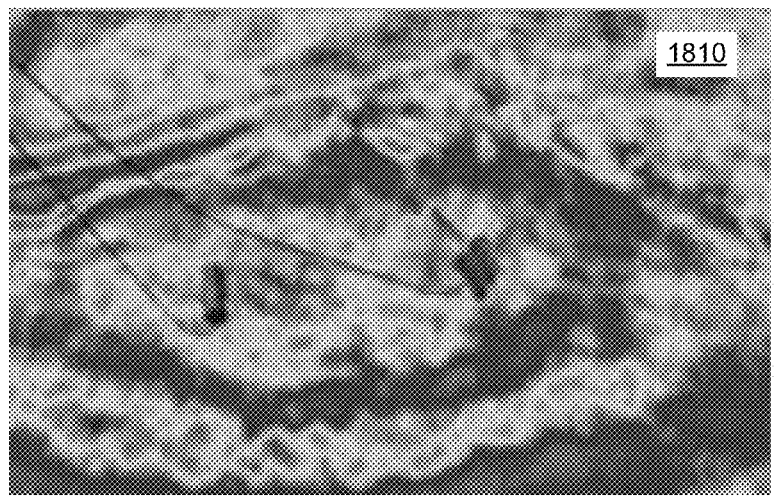
FIG. 18 illustrates an example of a method with respect to data.
Figure 18:
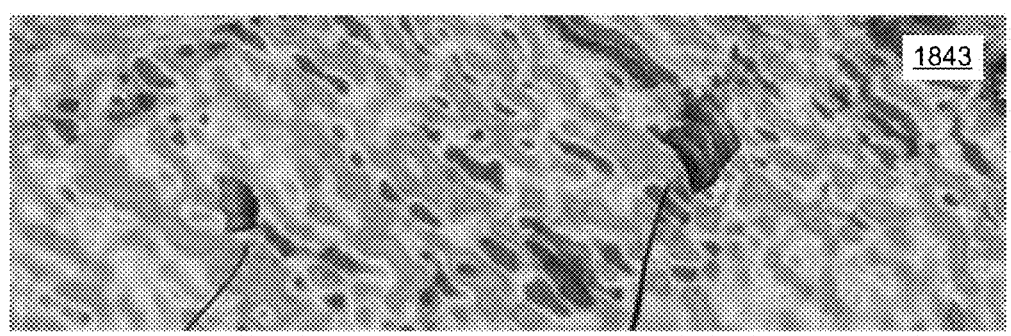
Figure 18:
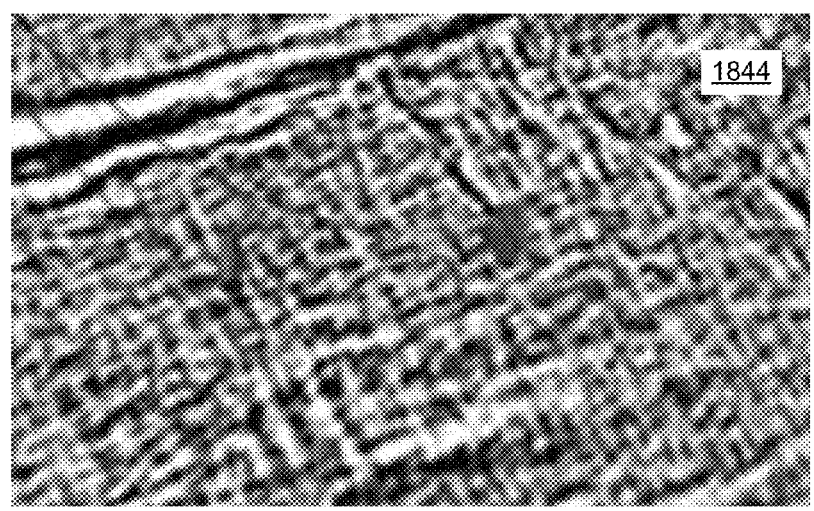

FIG. 18 shows examples of processing data, for example, to illustrate features associated with carbonate. Specifically, the examples of FIG. 18 pertain to the Korchagin oil field in the Caspian Sea where data 1810 are a seismic slice near the top of carbonates, data 1843 are the third component from PCA and data 1844 are the fourth component from PCA. The data 1843 are calculated from a reflection surface at the top of carbonates and hence correspond to a 2D decomposition. The data 1810, 1843 and 1844 are also illustrated with respect to two horizontal wells with image log interpretation results (right well) and density log (left well).

As shown in FIG. 18, the fourth orthogonal component 1844 and the third orthogonal component 1843 calculated via seismic reflection surface at top of carbonate correlate with the image log results and, for example, can be used in a manner akin to seismic attributes to detect fracture corridors.

Figure 19:
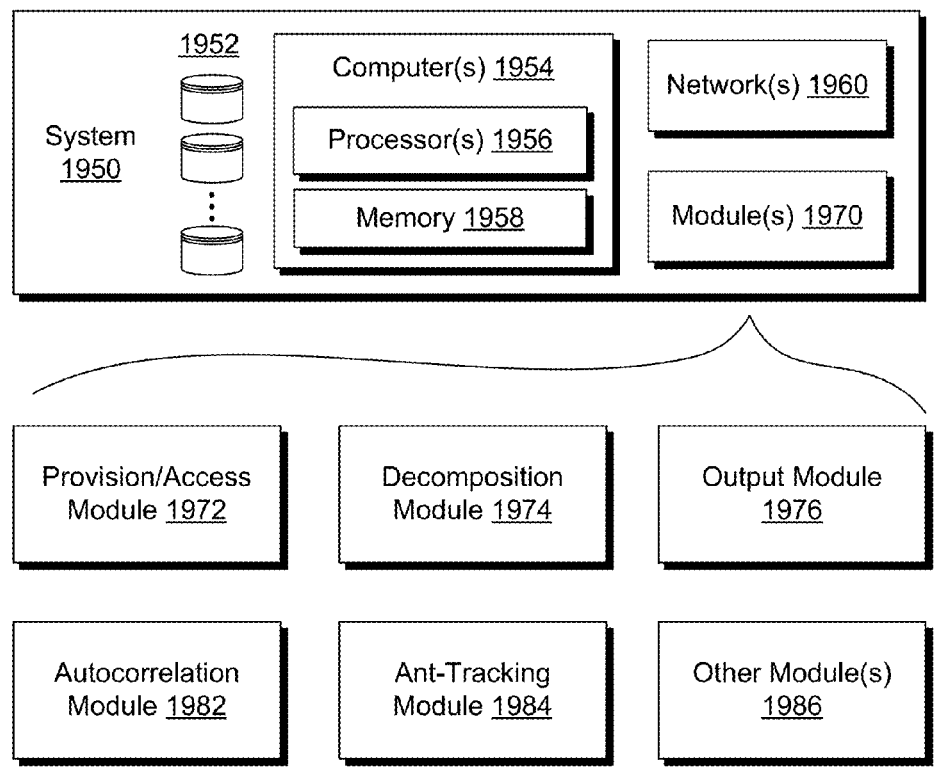
FIG. 19 illustrates an example of a system and examples of modules.

FIG. 19 shows an example of a system 1950 that includes one or more information storage devices 1952, one or more computers 1954, one or more networks 1960 and one or more modules 1970. As to the one or more computers 1954, each computer may include one or more processors (e.g., or processing cores) 1956 and memory 1958 for storing instructions (e.g., modules), for example, executable by at least one of the one or more processors. As an example, a computer may include one or more network interfaces (e.g., wired or wireless), one or more graphics cards, a display interface (e.g., wired or wireless), etc. In the example of FIG. 19, the one or more memory storage devices 1952 may store seismic data for a geologic environment.

As an example, a system can include one or more processors for processing information; memory operatively coupled to the one or more processors; and modules that include instructions stored in the memory and executable by at least one of the one or more processors. As shown in the example of FIG. 19, such modules may include, for example, a provision module 1972 for providing seismic data for a subsurface region that includes a reflector; a decomposition module 1974 for decomposing at least a portion of the seismic data using principal component analysis (PCA) to generate at least one principal component; and an output module 1976 for outputting output data based at least in part on the at least one principal component. As an example, a system may include an autocorrelation module 1982 for generating autocorrelation data. As an example, a system may include an ant-tracking module 1984 for generating ant track data. As an example, a system may include a fracturing module 1986, for example, to perform one or more calculations, tasks, etc. associated with fracturing. As an example, a system may include one or more modules 1988, which may be provided to analyze data, control a process, perform a task, perform a workstep, perform a workflow, etc.

Figure 20:
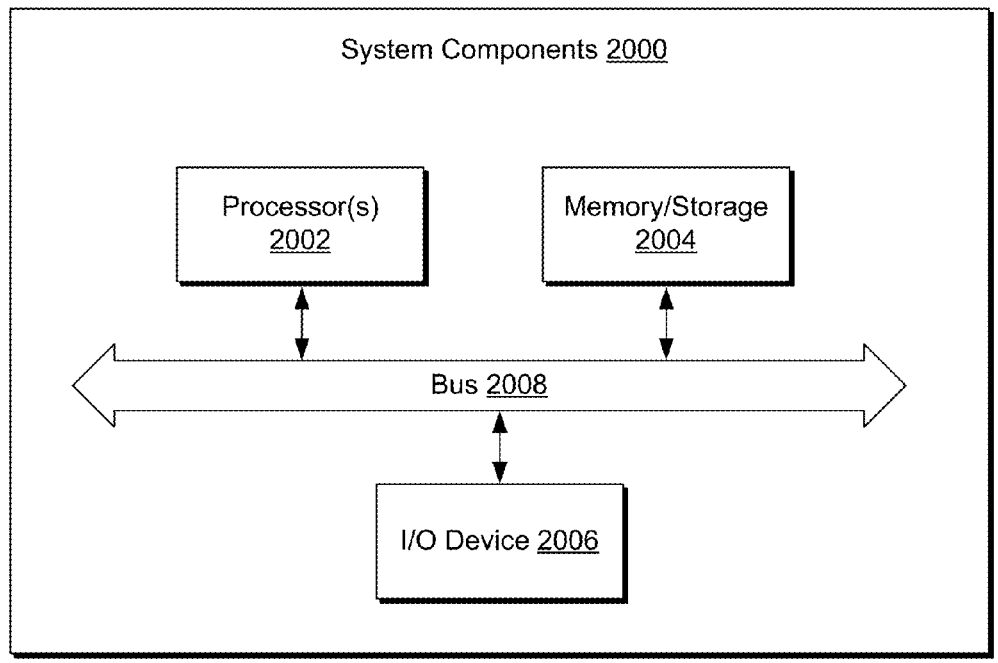
FIG. 20 illustrates example components of a system and a networked system.
Figure 20:
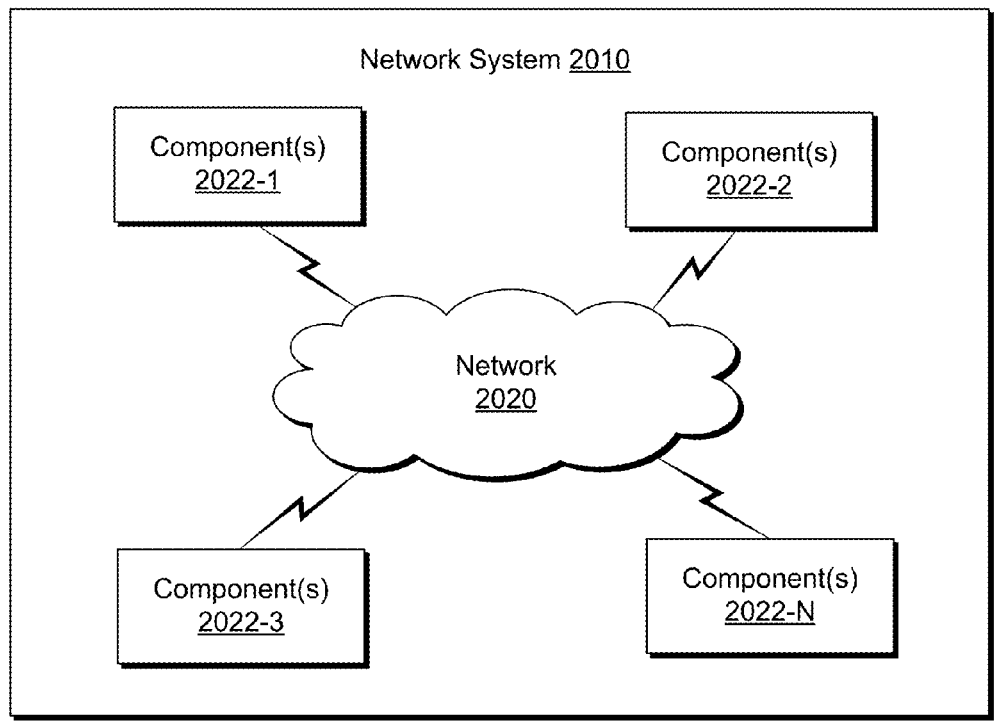

FIG. 20 shows components of an example of a computing system 2000 and an example of a networked system 2010. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
    providing seismic data for a subsurface region that comprises a reflector;
    decomposing at least a portion of the seismic data using principal component analysis (PCA) to generate at least one principal component; and
    outputting output data based at least in part on the at least one principal component.

2. The method of claim 1 wherein the providing seismic data provides autocorrelation data.

3. The method of claim 1 further comprising generating autocorrelation data for at least a portion of the provided seismic data.

4. The method of claim 1 wherein the reflector comprises a reflector associated with a fracture.

5. The method of claim 1 wherein the seismic data comprises at least one member selected from a group consisting of noise and an acquisition footprint.

6. The method of claim 1 wherein the at least one principal component comprises a principal component orthogonal to another principal component that comprises noise.

7. The method of claim 1 wherein the at least one principal component comprises a principal component orthogonal to another principal component that comprises indicia of an acquisition footprint.

8. The method of claim 1 wherein the at least one principal component comprises a principal component orthogonal to another principal component that comprises noise and orthogonal to yet another principal component that comprises indicia of an acquisition footprint.

9. The method of claim 1 further comprising performing ant-tracking on at least a portion of at least one of the at least one principal component.

10. The method of claim 9 wherein the outputting output data comprises outputting ant-tracking data based at least in part on performing ant-tracking.

11. The method of claim 1 wherein the subsurface region comprises shale.

12. The method of claim 1 wherein the subsurface region comprises a layer and wherein the reflector intersects the layer.

13. The method of claim 1 wherein the reflector comprises a reflector of a fracture, the fracture being generated by a hydraulic fracturing process.

14. The method of claim 1 further comprising performing a fracturing process on the subsurface region based at least in part on the output data.

15. The method of claim 1 wherein the subsurface region comprises multiple reflectors associated with artificial fractures in the subsurface region.

16. A system comprising:
one or more processors for processing information;
memory operatively coupled to the one or more processors; and
modules that comprise instructions stored in the memory and executable by at least one of the one or more processors, wherein the modules comprise:
   a provision module for providing seismic data for a subsurface region that comprises a reflector;
   a decomposition module for decomposing at least a portion of the seismic data using principal component analysis to generate at least one principal component; and
   an output module for outputting output data based at least in part on the at least one principal component.

17. The system of claim 16 comprising an autocorrelation module for generating autocorrelation data.

18. The system of claim 16 comprising an ant-tracking module for generating ant track data.

19. One or more non-transitory computer-readable storage media comprising computer-executable instructions to instruct a computing system to:
   access seismic data for a subsurface region that comprises a reflector;
   decompose at least a portion of the seismic data using principal component analysis (PCA) to generate at least one principal component; and
   output output data based at least in part on the at least one principal component.

20. The one or more non-transitory computer-readable storage media of claim 19 comprising computer-executable instructions to instruct a computing system to autocorrelate data to generate autocorrelation data.

* * * * *